United States Patent
Bruestle et al.

(10) Patent No.: US 11,790,267 B2
(45) Date of Patent: Oct. 17, 2023

(54) APPARATUS FOR HARDWARE ACCELERATED MACHINE LEARNING

(71) Applicant: Intel Corporation, Santa Clara, CA (US)

(72) Inventors: Jeremy Bruestle, Seattle, WA (US); Choong Ng, Seattle, WA (US)

(73) Assignee: Intel Corporation, Santa Clara, CA (US)

( * ) Notice: Subject to any disclaimer, the term of this patent is extended or adjusted under 35 U.S.C. 154(b) by 603 days.

(21) Appl. No.: 17/070,009

(22) Filed: Oct. 14, 2020

(65) Prior Publication Data

US 2021/0049508 A1 Feb. 18, 2021

Related U.S. Application Data

(62) Division of application No. 15/588,558, filed on May 5, 2017, now Pat. No. 10,817,802.

(Continued)

(51) Int. Cl.
*G06N 20/00* (2019.01)
*G06F 9/46* (2006.01)
(Continued)

(52) U.S. Cl.
CPC ............... *G06N 20/00* (2019.01); *G06F 5/01* (2013.01); *G06F 7/48* (2013.01); *G06F 7/582* (2013.01);
(Continued)

(58) Field of Classification Search
None
See application file for complete search history.

(56) References Cited

U.S. PATENT DOCUMENTS 4,937,770 A * 6/1990 Samuels ............... G06F 11/261
703/2
5,138,695 A 8/1992 Means et al.
(Continued)

FOREIGN PATENT DOCUMENTS

| EP | 0422348 A2 | 4/1991 |
| WO | 2006115896 | 11/2006 |
| WO | WO2009034517 | 3/2009 |

OTHER PUBLICATIONS

European Search Report from related application EP 17796609 dated Dec. 13, 2019.
(Continued)

*Primary Examiner* — Eric Coleman
(74) *Attorney, Agent, or Firm* — Trop, Pruner & Hu, P.C.

(57) ABSTRACT

An architecture and associated techniques of an apparatus for hardware accelerated machine learning are disclosed. The architecture features multiple memory banks storing tensor data. The tensor data may be concurrently fetched by a number of execution units working in parallel. Each operational unit supports an instruction set specific to certain primitive operations for machine learning. An instruction decoder is employed to decode a machine learning instruction and reveal one or more of the primitive operations to be performed by the execution units, as well as the memory addresses of the operands of the primitive operations as stored in the memory banks. The primitive operations, upon performed or executed by the execution units, may generate some output that can be saved into the memory banks. The fetching of the operands and the saving of the output may involve permutation and duplication of the data elements involved.

20 Claims, 10 Drawing Sheets

Related U.S. Application Data

(60) Provisional application No. 62/333,214, filed on May 7, 2016.

(51) Int. Cl.
  *G06F 7/48* (2006.01)
  *G06F 5/01* (2006.01)
  *G06F 7/58* (2006.01)

(52) U.S. Cl.
  CPC ........ *G06F 9/46* (2013.01); *G06F 2207/4824* (2013.01)

(56) References Cited

U.S. PATENT DOCUMENTS

| | | | |
|---|---|---|---|
| 5,625,825 | A | 4/1997 | Rostoker et al. |
| 5,751,987 | A | 5/1998 | Mahant-Shetti et al. |
| 5,892,697 | A | 4/1999 | Brakefield |
| 6,055,619 | A * | 4/2000 | North ............ G10H 7/002 712/35 |
| 6,216,167 | B1 | 4/2001 | Momirov |
| 6,285,779 | B1 | 9/2001 | Lapidous et al. |
| 6,571,268 | B1 * | 5/2003 | Giacalone ............ G06F 9/3005 712/E9.032 |
| 16,768,992 | | 7/2004 | Jolitz |
| 9,747,547 | B2 | 8/2017 | McCormick et al. |
| 2002/0062466 | A1 | 5/2002 | Noguchi |
| 2002/0075871 | A1 | 6/2002 | Blanc et al. |
| 2002/0126661 | A1 | 9/2002 | Ngai |
| 2004/0078418 | A1 | 4/2004 | Law et al. |
| 2006/0259744 | A1 | 11/2006 | Matthes |
| 2007/0005322 | A1 | 1/2007 | Patzer et al. |
| 2007/0005676 | A1 * | 1/2007 | Henry ............ G06F 7/49921 708/552 |
| 2007/0211064 | A1 | 9/2007 | Buck et al. |
| 2009/0313195 | A1 | 12/2009 | McDaid et al. |
| 2010/0005221 | A1 | 1/2010 | Esko |
| 2010/0076915 | A1 | 3/2010 | Xu et al. |
| 2010/0146020 | A1 * | 6/2010 | Burr ............ G06F 7/509 708/207 |
| 2011/0029471 | A1 | 2/2011 | Chakradhar et al. |
| 2011/0206053 | A1 | 8/2011 | Henry et al. |
| 2012/0005141 | A1 | 1/2012 | Sasagawa |
| 2013/0054665 | A1 | 2/2013 | Felch |
| 2014/0040700 | A1 | 2/2014 | Kobori et al. |
| 2014/0136583 | A1 | 5/2014 | Hyde et al. |
| 2014/0188968 | A1 | 7/2014 | Kaul et al. |
| 2014/0344194 | A1 | 11/2014 | Lee et al. |
| 2014/0365548 | A1 * | 12/2014 | Mortensen ............ G06F 9/3001 708/523 |
| 2015/0199963 | A1 | 7/2015 | Maaninen |
| 2015/0324685 | A1 | 11/2015 | Bohn et al. |
| 2016/0092166 | A1 | 3/2016 | Gschwind |
| 2016/0379137 | A1 | 12/2016 | Burger et al. |

OTHER PUBLICATIONS

Jones et al., "Learning in Linear Systolic Neural Network Engines: Analysis and Implementation", IEEE Transactions on Neural Networks, Jul. 1, 1993.

European Search Report from related application EP 17796610 dated Dec. 13, 2019.

Minkenberg, "On packet switch design", Eindoven University of Technology, Jan. 1, 2001.

Final Office Action in related matter U.S. Appl. No. 15/399,714 dated Jan. 2, 2020.

International Search Report and Written Opinion from related application PCT/US2017/012600 dated Mar. 27, 2017.

International Preliminary Report on Patentability and Written Opinion received in PCT/US2017/012600, dated Jul. 10, 2018.

Office Action from related U.S. Appl. No. 15/399,714 dated Jul. 25, 2019.

European Search Report from related application EP17736464 dated Jun. 21, 2019.

Farabet et al., "NeuFlow: A Runtime Reconfigurable Dataflow Processor for Vision", Computer Vision and Pattern Recognition Workshops (CVPRW), 2011 IEEE Computer Society Conference on IEEE, Jun. 20, 2011.

Chen et al., "DianNao: A Small-Footprint High-Throughput Accelerator for Ubiquitous Machine-Learning", downloaded from www.novel.ict.ac.cn/ychen/pdf/DianNao.pdf on Nov. 6, 2017.

Kanoun et al., "Low Power and Scalable Many-Core Architecture for Big-Data Stream Computing", 2014 IEEE Computer Society Annual Symposium on VLSI, IEEE, Jul. 9, 2014.

International Search Report and Written Opinion dated Oct. 2, 2017, for PCT Application No. PCT/US2017/031477, 10 pages.

International Search Report and Written Opinion dated Oct. 24, 2017, for PCT Application No. PCT/US2017/031478, 10 pages.

Lozito et al., "FPGA Implementations of Feed Forward Neural Network by Using Floating Point Hardware Accelerators," Theoretical and Applied Electrical Engineering vol. 12, No. 1, Mar. 2014 (http://advances.utc.sk/index.php/AEEE/article/view/831).

European Search Report from related application EP 17796609 dated Apr. 2, 2020.

International Preliminary Report on Patentability and Written Opinion received in PCT/US2017/031477, dated Nov. 22, 2018, 8 pages.

International Preliminary Report on Patentability and Written Opinion received in PCT/US2017/031478, dated Nov. 22, 2018, 8 pages.

Chinese Patent Office, First Office Action dated Nov. 28, 2022 in Chinese Patent Application No. 201780040821.X (3 pages).

European Patent Office, Office Action dated Nov. 11, 2021 in European Patent Application No. 17796609.0.

Tsai, "Data Abstractions", May 23, 2012, XP055679782, retrieved from: URL:https://people.cs.nctu.edu.tw/~cjtsai/courses/classnotes/ics12_08_Data_Abstractions.pdf.

* cited by examiner

APPARATUS FOR HARDWARE ACCELERATED MACHINE LEARNING

CROSS REFERENCE TO RELATED APPLICATION

This application is a divisional of U.S. patent application Ser. No. 15/588,558, filed May 5, 2017, which claims priority to U.S. Provisional Patent Application Ser. No. 62/333,214, entitled "Memory and Processing Architecture for Hardware Accelerated Machine Learning," filed May 7, 2016. The content of each of the above applications is hereby incorporated by reference in its entirety.

BACKGROUND

Machine learning is an emerging field of computer science that has recently attracted much attention and interests. Simply put, machine learning is an automated way of analyzing data and drawing conclusions or making predictions based on the data. Unlike solving an analytical problem, where logical relationship between input (i.e., the data) and output (i.e., the conclusions or predictions) are known and formulated into an algorithm which produces the output based on the input, machine learning takes an approach that is more like how human brain may process information. Specifically, machine learning algorithms "learns" the relationship, which may or may not be logical, between the input and the output by processing a certain amount of sample data. In other words, a programmer does not need to provide with a machine learning algorithm any logical, analytical and/or cognitive knowledge between the input and the output. The machine learning algorithm, which is a quite generic one at the onset of the training or learning process, will simply figure out a relationship between the input and the output by studying the sample data.

For example, a machine learning algorithm may be fed with 1,000 sample pictures each having a crocodile in it, as well as another 1,000 sample pictures each not having a crocodile in it. In addition, the machine learning algorithm is told which pictures have or have not a crocodile therein. No other information needs to be programed into the algorithm regarding any specific details of a crocodile, such as its typical color, size, general shape, usual habitat, or the like. The pictures having a crocodile may have all kinds of crocodiles, such as a real crocodile, a cartoon crocodile, a wild crocodile, a farmed crocodile, a crocodile at rest by a river bank, a crocodile swimming in the water, an eating crocodile, a crocodile showing its belly, etc. Through processing the 2,000 sample pictures, possibly repeatedly for many times, the machine learning algorithm modifies itself and gradually tunes the originally generic algorithm into a more complex one that is able to process any picture and make a prediction whether the picture contains a crocodile of any kind, with a high rate of success.

An unsurprising aspect of machine learning, just as equally true in human learning, is that a machine learning algorithm does not "learn very well" if it is not provided with a sufficiently large amount of sample data, and/or if it processes the sample data for only a few times. As demonstrated in the example above, a large quantity of sample or training data is generally needed, with sufficient times of repetition, for a machine learning algorithm to make the "learning" successful. Depending on the complexity of the problem to solve and the successful rate to achieve, a machine learning algorithm may take hours, days or even months to modify and fine-tune itself to become "well learned". Therefore, a solution for accelerating the learning process is required.

BRIEF DESCRIPTION OF THE DRAWINGS

The Detailed Description is set forth with reference to the accompanying figures.

DETAILED DESCRIPTION

As stated above, machine learning is an automated way for a generic algorithm to learn, by analyzing training data, to draw certain conclusions or make certain predictions based on the data. To achieve a satisfactory result of machine learning, it typically requires the algorithm to process a large quantity of training data, which may take a prolong period of time and/or a lot of computation resources. Therefore, a solution for accelerating the learning process is required.

Figure 1:
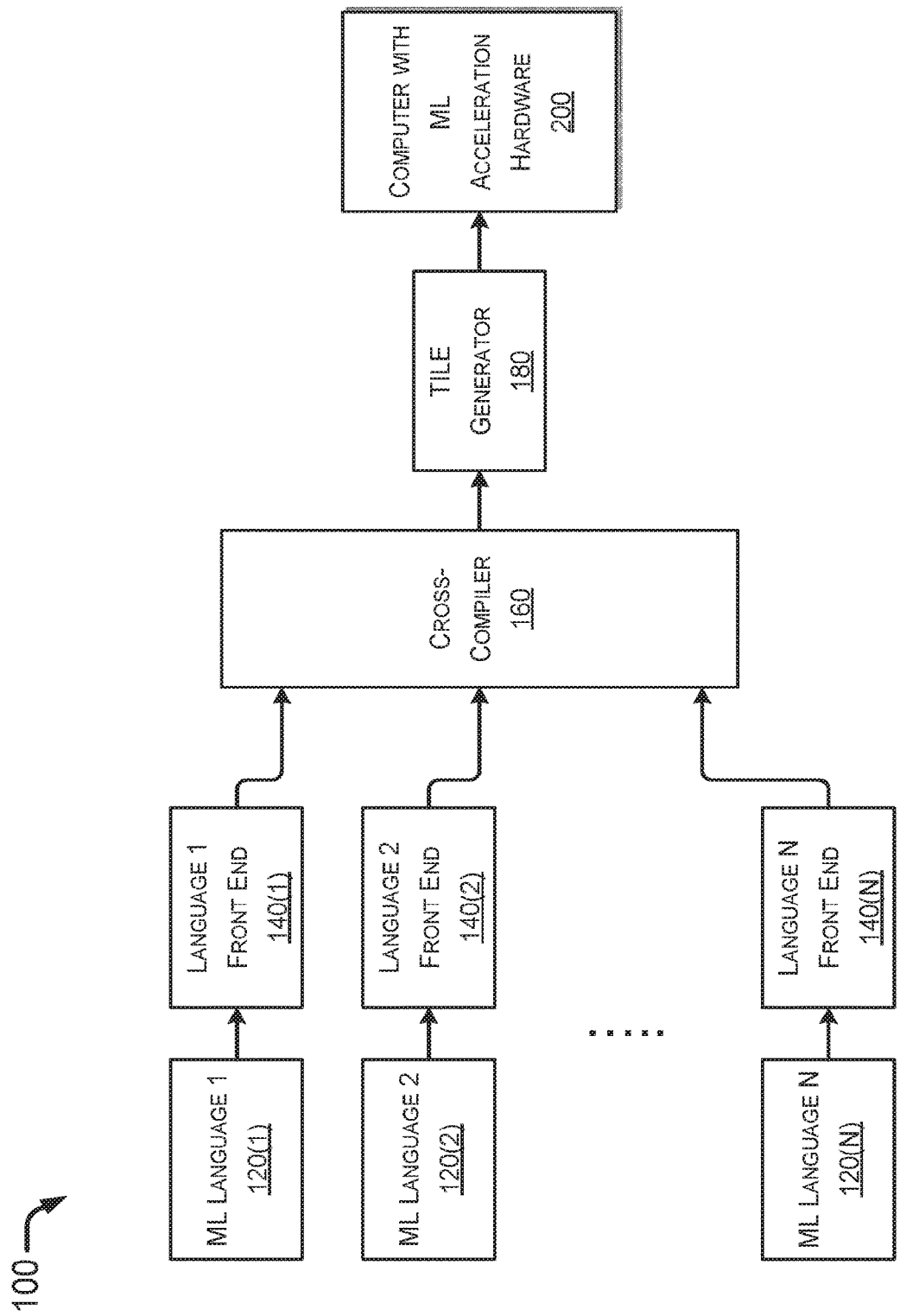
FIG. 1 is a top-level context diagram for Hardware Accelerated Machine Learning according to the present disclosure.

FIG. 1 is a top-level context diagram for Hardware Accelerated Machine Learning according to the present disclosure. A machine learning (ML) acceleration hardware is usually employed by, or embedded in, a computer device, such as the computer with ML acceleration hardware 200 shown in FIG. 1. Computer 200 takes in training data generated by cross-compiler 160 and TILE generator 180 of FIG. 1. The reason that cross-compiler 160 is needed in this context is because the training data may originally be encoded using different ML languages, as explained below.

For some applications, it may be feasible to collect or otherwise prepare the training data in advance, such as the pictures with or without a crocodile in the example above. However, for some applications, the training data may be collected in real-life situations by various equipment or technical platforms each having a specific machine learning language. For example, a ML algorithm may aim to diagnose whether a patient may have cirrhosis based on some abdominal ultrasound images, and the algorithm would require many abdominal ultrasound images as training data. The ultrasound images may be collected from many patients located at various parts of the world by different medical equipment platforms, each employing a different ML language. The different ML languages readily post a problem to the ML algorithm, as the ML algorithm is required to take in training data employing various ML languages.

For this reason, the context diagram of FIG. 1 includes multiple language front ends 140(1)-140(N) for various ML languages 120(1)-120(N). Each of langue front ends 140(1)-140(N) feeds a respective one of ML languages 120(1)-120(N) to cross-compiler 160, which compiles the training data encoded in different ML languages 120(1)-120(N) such that the training data is encoded with an intermediate language (IL) called TILE. TILE generator 180 then formulate the output of cross-compiler 160 into the training data that can be taken in by computer 200 which has ML acceleration hardware.

The training of a ML algorithm, as well as the operation of the ML algorithm after it is trained, usually involve heavily so-called "tensor operations", or computational operations of multidimensional tensors. In its simplest definition, a multidimensional tensor is a multidimensional array of real numbers. Most of the tensor operations involved in a ML algorithm fall in a category called "tensor contraction", which takes two tensors as input and applies operations such as multiplication and accumulation to the two tensors, resulting in an output tensor.

The tensor contraction operations for machine learning may be performed by general purpose hardware such as a central processing unit ("CPU"). For achieving a better performance, a graphical processing unit ("GPU") or array of GPUs may be employed which is designed to process vectors of image workloads more efficiently than a CPU. However, certain characteristics of tensor contraction operations for machine learning, such as consistent data flow, large number of multiplications, and specialized nature of the non-multiplication operations, allow for more significant acceleration via hardware by designing the hardware to be specifically tailored for performing such tensor contraction operations for machine learning.

Specifically, the acceleration hardware for machine learning may be implemented in a form of a Hardware Accelerated Machine Learning apparatus termed a "Tensor Processing Unit (TPU)" herein, that is able to efficiently execute a restricted set of primitive instructions for performing the tensor contraction operations for machine learning. In particular, a TPU is a semiconductor device that contains hardware for performing operations optimally for tensor operations and other operations specific to machine learning. For example, where a GPU may have hardware specific to quaternion operations, such operations, while related to linear algebra are not typically used in ML tensor operations. In contrast permutations and noise generation are generally not implemented in GPUs, but are commonly used in ML. In addition to hardware support for ML specific operations, the hardware is implemented in a way to take advantage of pipelining and other hardware/chip design techniques to lower the number of clock cycles used to perform those ML specific operations.

Figure 2:
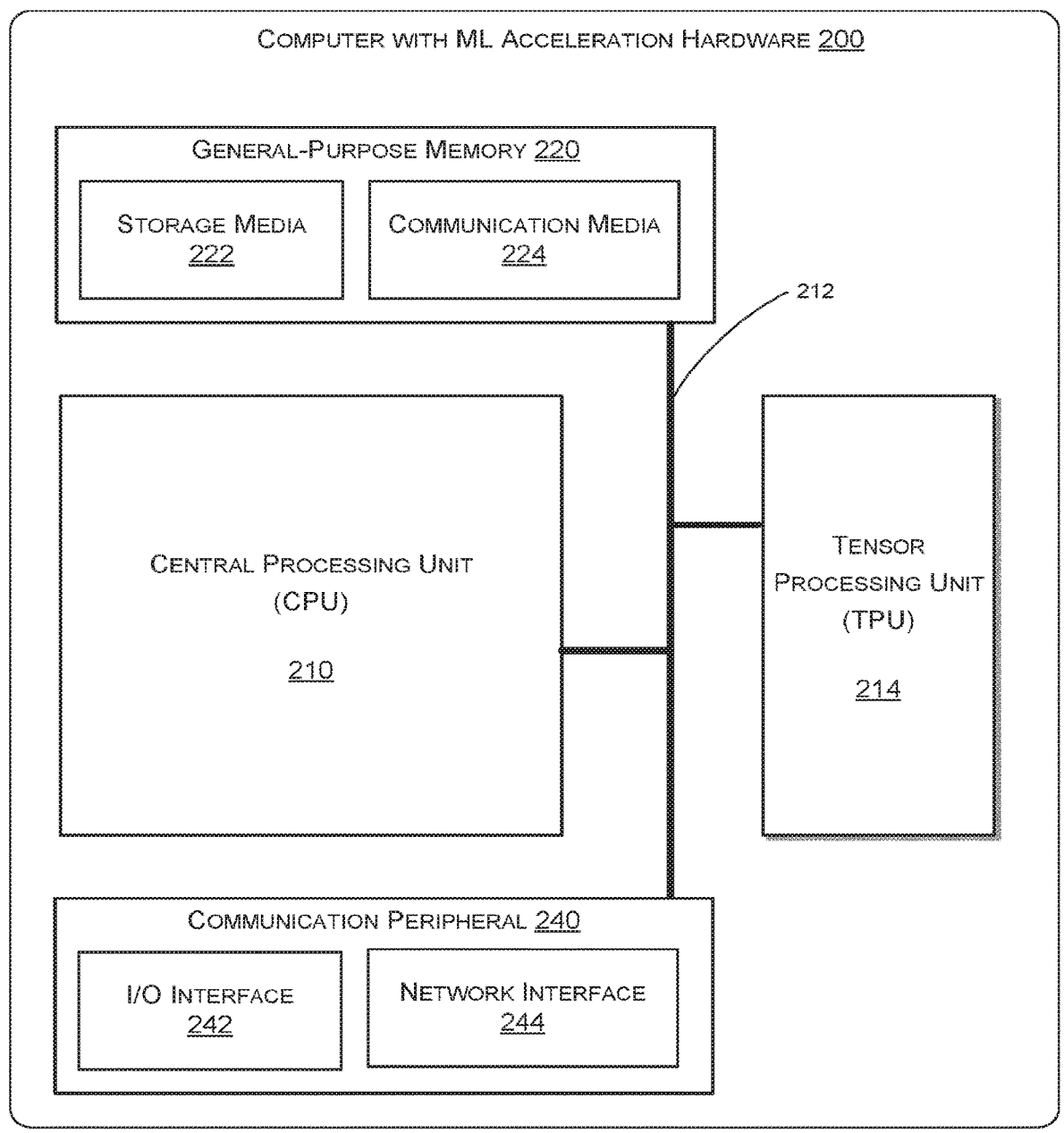
FIG. 2 is a context diagram for a Machine Learning Acceleration Hardware according to the present disclosure.

FIG. 2 is a context diagram for a Machine Learning Acceleration Hardware according to the present disclosure, wherein a TPU 214 is embedded in the computer 200. In addition to performing tensor contractions, TPU 214 may aid in accelerating other tensor-related auxiliary operations for machine learning, such as element-wise nonlinear operations and addition of random noise. In some embodiments, computer 200 may include more than one TPU 300 and thus support multi-thread processing for highly parallel applications such as machine learning.

Computer 200 may be any computing device including a standalone computer, a networked server, or an embedded system specific to machine learning. Computer 200 generally has a CPU 210 that is any processor that executes computer readable instructions ranging from general purpose CPUs to embedded controllers.

CPU 210 is communicatively coupled via a bus 212 to TPU 214 and a general-purpose memory 220. The general-purpose memory 220 may be any computer readable media that stores an operating system and other applications each comprised of computer readable instructions. General-purpose memory 220 may include storage media 222 and communications media 224. Computer storage media 222 may include volatile and non-volatile, removable and non-removable media implemented in any method or technology for storage of information such as computer readable instructions, data structures, program modules, or other data. Typically, storage media 222 may be comprised of dynamic random access memory (DRAM), but this need not always be the case. In fact, storage media 222 may also be, but is not limited to, static random access memory (SRAM), ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media 224 may embody computer readable instructions, data structures, program modules, or other data in a modulated data signal, such as a carrier wave, or other transmission mechanism. As defined herein, computer storage media does not include communication media.

Computer 200 of FIG. 2 may further include a communication peripheral 240 that is also communicatively coupled with TPU 214, CPU 210 and general-purpose memory 220 via bus 212. Communication peripheral 240 may be comprised of input/output (I/O) interface 242 and Network interface 244. I/O interface 242 may be any controller card, such as a universal asynchronous receiver/transmitter (UART) used in conjunction with a standard I/O interface protocol such as RS-232 and/or Universal Serial Bus (USB). In the case of highly parallel applications such as machine learning, the I/O interface may facilities one or more I/O channels and/or parallel I/O channels. For example, operational control with TPU 214 may be effected over a Peripheral Component Interconnect (PCI) or Peripheral Component Interconnect-Express (PCI-E) bus. Memory controllers may interface via a parallel memory bus e.g. a DRAM bus.

On the other hand, network interface 244 may potentially work in concert with I/O interface 242 and may be a network interface card supporting Ethernet and/or Wi-Fi and/or any number of other physical and/or datalink protocols. Again, in the case of highly parallel applications such as machine learning, multiple network interfaces 244 may be supported by the computer 200.

Figure 3:
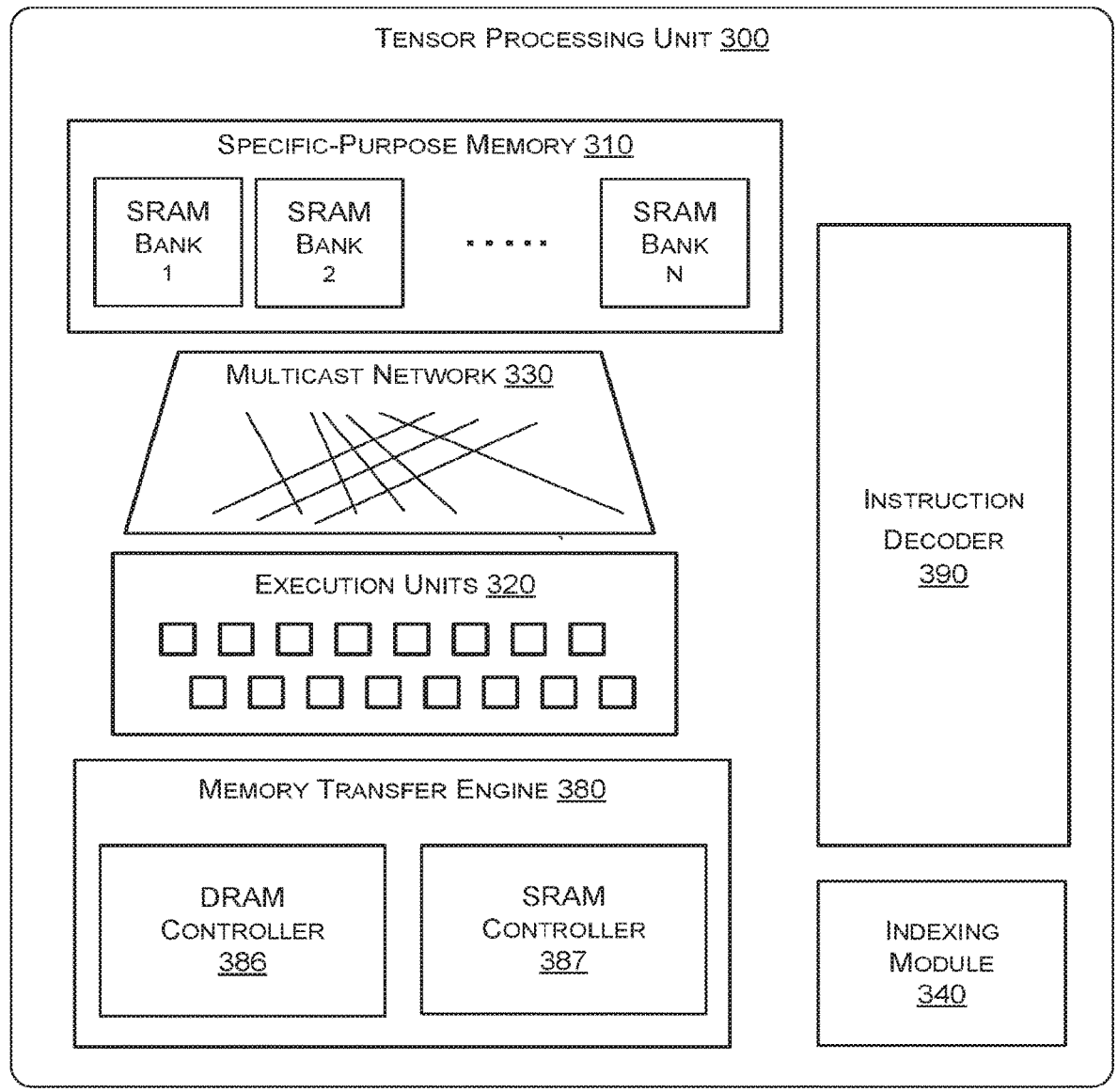
FIG. 3 is a block diagram of an example architecture of an apparatus for Hardware Accelerated Machine Learning according to the present disclosure.

FIG. 3 is a block diagram of an example architecture of an apparatus for Hardware Accelerated Machine Learning, i.e., TPU 300, according to the present disclosure. An overall introduction of TPU 300 is given immediately below, while each component thereof will be separately described in detail at later parts of the present disclosure.

Firstly, TPU 300 includes specific-purpose memory 310 that may be comprised of multiple banks of memory (such as SRAM) that are local to TPU 300 (as opposed to general-purpose memory 220 of FIG. 2 which is non-local to TPU 300). The SRAM banks of local memory 310 support concurrent random access. In particular, they support very wide memory access (i.e., multiple byte access within a single computer instruction) for accessing vectors and larger sets of values in a single computer instruction, which is a typical case for machine learning acceleration hardware.

Local SRAM banks 310 holds tensor data, or operands, that can be accessed by a plurality of execution units 320, a second element of TPU 300, which collectively perform tensor-related operations (or, "tensor operations", in short) for machine learning via executing a series of instructions in an instruction set restricted to TPU 300. Namely, the instruction set contains a set of primitive instructions via which various tensor operations are performed by execution units 320 on the operands stored in local memory 310. Execution units 320 may store some output of the tensor operations to local memory 310 or even non-local memory 220 (of FIG. 2), as instructed by some instructions of the instruction set. In general, execution units 320 are identical to each other and work concurrently, although each execution unit 320 may receive different operands from SRAM banks 310, and collectively perform an instruction.

As shown in FIG. 3, TPU 300 includes a third element, one or more multicast networks 330, via which execution units 320 access data stored in one or more of SRAM banks 310 so as to perform tensor operations. For some operations, execution units 320 may generate some output to be written back to one or more of SRAM banks 310, also via multicast network 330. Multicast network 330 generally is composed of a series of layers each comprised of a plurality of switch nodes, and data stored in local memory 310 will propagate through the series of layers to reach execution units 330 to be processed. The data fetched from, or written to, SRAM banks 310 typically includes a vector of data elements, usually one element from/to each of SRAM banks 310. Some of the data elements may duplicate or otherwise multiply while propagating through the series of layers of the multicast networks 330, and the order of the data elements may be rearranged or permutated during the propagation. The multiplication and permutation of the data element may be specific to each instruction operation. Namely, the multicast networks 330 may have a generic design that is adaptive based on the specific instruction(s) being performed by execution units 320. In one embodiment, the multicast networks 330 are Beneš networks.

TPU 300 also includes a fourth element, instruction decoder 390. Each ML instruction contains various information for the operation of TPU 300, such as primitive operations for execution units 320 to operate, as well as memory addresses of the operand data for the primitive operations. Instruction decoder 390 decodes a ML instruction to reveal these information, and accordingly uses these information to orchestrate other elements of TPU 300 and/or computer 200 to work in concert and perform the ML operation as instructed. An instruction dictates what tensor operation (or, in some cases, a non-operation) execution units 320 are to perform for each clock cycle. In addition, an instruction may contain a number of address references which indicate the location of data to fetch from local memory 310 or non-local memory 220 as operand(s), and/or the location of local memory 310 or non-local memory 220 an operation output is supposed to store at. Also, an instruction may specify a next instruction to be performed by execution 320.

As shown in FIG. 3, TPU 300 may include a fifth element, indexing module 340. The major function of indexing module 340 is to support activities of TPU 300 for looping over tensor indexes and computing memory addresses or other variables. Indexing module 340 may include one or more counter units and one or more addressing units, which will be described later in the present disclosure.

In some embodiments, TPU 300 may also include a sixth element, memory transfer engine 380, which functions to move tensor data from one memory space to another. For example, memory transfer engine 380 may facilitate moving tensor data within local memory 310 of FIG. 3, within non-local memory 220 of FIG. 2, or between local memory 310 and non-local memory 220. Memory transfer engine 380 may include components such as index module 384, DRAM controller 386 and SRAM controller 387.

The six elements of TPU 300, as described above and shown in FIG. 3, may include one or more of the following hardware components, modules or submodules:

Execution Units 320
Multicast Network 330
Indexing Module 340. An index module may also be included in each of DRAM controller 386 and SRAM controller 387.
Bank Permutation Network, which is included in memory transfer engine 380. Specifically, each of DRAM controller 386 and SRAM controller 387 may have one or more bank permutation networks.
DRAM controller 386
SRAM controller 387
Memory Transfer Engine 380
Instruction Decoder 390

Note that the DRAM controller 386 and the SRAM controller 387 are specifies of a memory controller that accesses computer readable memory. In general, we will refer to the DRAM controller 386 and the SRAM controller 387 generically as a banked asynchronous memory controller, or more specifically a banked asynchronous memory read unit and/or a banked asynchronous memory write unit. These hardware components are individually described in greater detail below.

Execution Units

Collectively as a whole, the execution units (EUs) form the primary computational element of the TPU. The computational element performs the multiply-accumulate functionality used during tensor contractions. It also provides a method to perform piecewise linear element-wise operations and other auxiliary functions.

Each of the execution units is able to perform instructions from a limited instruction set, and for each clock cycle, initiates one operation. The EUs may be controlled by a single instruction decoder such that for each clock cycle all EUs of the TPU performs a same operation.

Each execution unit contains three logical registers, A, S, and R. The A register is a traditional accumulator. The S register is a status register which allows conditional execution of instructions. The R register holds a PRNG (Pseudo Random Number Generator) state, which will be disclosed below.

An execution unit may receive two primary operands from a memory system that includes a "B-side memory" and a "C-side memory". The two operands may be called "B" and "C", each retrieved from one side of the memory system, respectively. The two operands may be used in different ways (or even ignored, in some cases) by the various instructions of the instruction set. In addition, an instruction thereof may include bits used to determine whether to execute the instruction based on the status register and/or how to update the status register.

Design Parameters

A set of design parameters, such as the parameters shown below along with their respective default values, determine the overall size and performance of the design of each EU. The default values are exemplary and may be subject to change depending on design requirements.

| Name | Default Value | Description/Formula |
|---|---|---|
| ELEM_WIDTH | 16 | Number of bits per operand |
| ACCUM_WIDTH | 48 | Number of bits per accumulator |
| EOP_BITS | 3 | Number of bits for EU opcode |
| COND_REGS | 2 | Number of conditional registers |
| COND_POW | 4 | pow(2, COND_REGS) |

Pinouts

Each EU may have the following set of external pins via which the EU is communicatively coupled to and interact with other one or more EU and/or other components of the TPU.

| Name | Width | Direction | Description |
|---|---|---|---|
| CLOCK | 1 | IN | Global Clock |
| RESET | 1 | IN | Reset |
| IN_OP | EOP_BITS | IN | Operation specification |
| IN_B | ELEM_WIDTH | IN | Input B |
| IN_C | ELEM_WIDTH | IN | Input C |
| IN_COND | COND_POW | IN | Conditional execution |
| IN_CSET | COND_REGS | IN | Conditional set mask |
| IN_CRST | COND_REGS | IN | Conditional reset mask |
| OUT_AL | ELEM_WIDTH | OUT | Accumulator lower bits output |

In the above table, IN_OP is the instruction opcode, as defined in the instruction set table below. IN_B and IN_C are two signed integer operands which come from the B side and C side of the memory system, respectively, each ELEM_WIDTH wide. IN_COND, IN_CSET, and IN_CRST are related to conditional execution of an instruction by the EU, as described below. OUT_AL on a given clock represents the saturated low ELEM_WIDTH bits of the accumulator. This output may have a fixed pipeline delay relative to the inputs.

Instruction Set

The table below shows an example list of opcodes each corresponding to an instruction of the instruction set executable by the EUs. The implementation is only exemplary and one may reorder or add additional instructions as needed.

| IN_OP | Mnemonic | Description | Effect |
|---|---|---|---|
| 0 | MUL | Multiply | A := B * C |
| 1 | MAC | Multiply Accumulate | A := A + B * C |
| 2 | ASR | Arithmetic Shift Right | A := A » B |
| 3 | LTR | Linear Transform | A := (AL − B) * C |
| 4 | CMP | Compare | B <= A <= C |
| 5 | ARN | Add Random Noise | A := A + R(B) |
| 6 | SRN | Seed Random | R := (B « ELEM_WIDTH) | C |

Details of the instructions are provided as follows.

MUL The multiply instruction takes B and C as ELEM_WIDTH signed numbers, multiplies them at full width (i.e., generate a 2*ELEM_WIDTH wide output) and overwrites A register with the result. It is worth noting that, by multiplying 1 on either side, multiply can be used to perform a "SET" function.

MAC The multiply instruction takes B and C as ELEM_WIDTH signed numbers, multiplies them at full width (i.e., generate a 2*ELEM_WIDTH wide output) and adds the result to the A register.

ASR The instruction performs an arithmetic right shift of accumulator by the number specified in B, with proper sign extension. If the value of B is negative, no shift is performed. If the value of B is larger than ACCUM_WIDTH, the shift is equivalent to a shift of ACCUM_WIDTH.

LTR The instruction performs a linear transform on A (or more accurately, a register AL that is logically related to register A; see below). Specifically, it performs the function: A:=(AL−B)*C, where AL, B, and C are taken as signed ELEM_WIDTH bit numbers, and the multiplication is performed at full width.

CMP The instruction evaluates the expression (B<=AL and AL<=C). If the instruction is executed and the expression is true (i.e., the IN_COND test is true), then the status updates are applied. Otherwise, the status updates are not applied.

ARN The instruction adds a B bit random number to the accumulator. Specifically, as a first step, B is capped to the valid range. That is, if B>32, B is treated as 32; if B<1, B is treated as 1. Secondly, the lower order B bits are retained, and the upper bit is extended to all higher bits (up to ACCUM_WIDTH bits in total), resulting in a ACCUM_WIDTH wide signed number that is in the range of a B bit signed integer. This value is then added to the accumulator. Following that, the PRNG state is updated as described below in the PRNG section.

SRN This instruction sets the state of the PRNG based on B and C. For this operation, B and C are considered as unsigned integers of ELEM_WIDTH in length, and are then concatenated with one another, with B being the high order bits. If 2*ELEM_WIDTH is greater than 32, the bits higher than 32 are ignored. If 2*ELEM_WIDTH is less than 32, the high bits are 0 padded. This 32 bit number is then assigned to the R register.

Registers

As previously stated, each EU contains a plurality of registers. The most important register is the accumulator (A) register, which is the primary destination of most instructions. This accumulator is a signed integer which is ACCUM_WIDTH bits wide.

In addition to the physical accumulator register, there is a logical register AL, which is the saturated ELEM_WIDTH version of the accumulator. It is a signed integer ELEM_WIDTH in length. If the current value of the accumulator is representable by a signed ELEM_WIDTH value, then AL will be that value. If the current value of the accumulator is lower than the smallest signed ELEM_WIDTH value, AL will be the lowest valid ELEM_WIDTH signed integer. Conversely, if the value of the accumulator is greater than the largest signed ELEM_WIDTH, integer, AL will be set to the largest ELEM_WIDTH signed integer.

Furthermore, each execution unit contains a status register, S, which consists of COND_REGS independent bits. The S register is used for conditional execution as described below.

Finally, each execution unit has a R register holding a PRNG state, which is described in a later section of the present disclosure regarding PRNG.

Reset Behavior

If the reset pin, RESET, is held high during a clock, a reset is initiated and the values of all other pins are ignored. In addition, the reset clears all the bits in all registers to 0. Note that since 0 is a fixed point for the PRNG, this means that all numbers produced by the PRNG will be 0 until the PRNG is properly seeded.

Conditional Execution

The conditional execution mechanism is designed to allow conditional logic without data dependent flow control. The mechanism is designed primarily for the use in non-linear transformation, but may also be used by the programmer for any other reason. Based on the state of the COND_REGS bits in the status register and the input IN_COND, the instruction may be skipped. Namely, the instruction may be transformed into a no-op.

Specifically, interpreting the current state of the status register as a COND_REGS bit number S, if the the S'th bit of IN_COND is set, instruction is executed; otherwise the instruction becomes a no-op. Thus, if IN_COND is all 1 bits, the instruction is executed unconditionally; if IN_COND is all 0 bits, the instruction is always skipped.

In addition, if an instruction is executed, the status bits are updated based on IN_CSET and IN_CRST, such that bits specified in IN_CSET are set, and bits in IN_CRST are reset. More specifically, S:=(S & IN_CRST)|IN_CSET. In the case of the "CMP" instruction, these changes are made only if the instruction is executed (via IN_COND) and, additionally, if the comparison is true. If the instruction is skipped due to IN_COND, or the comparison for CMP fails, the status bits are left unmodified.

PRNG

The state of the PRNG, as held in the R register, is 32 bits (treated as unsigned internally). When used to generate a random number, the current value of the R register is utilized, and the internal state is updated as:

$$r'=(r<<1)|(1\&((r>>31)\wedge(r>>29)\wedge(r>>25)\wedge(r>>24)));$$

Timing

In general, the execution unit may pipeline operations. This means that the value of AL in OUT_AL may follow the instruction stream with some fixed delay. In addition, the instructions that use AL internally (e.g., LTR and CMP) may see an older version of AL due to internal pipelining, possibly necessitating the insertion of NOP, or no-op, instructions (in the case when IN_COND=0) after instructions that modify A before the use of AL (e.g., by LTR or CMP). However, changes to registers A, R, and S will always appear to complete in a single clock cycle.

Multicast Network

Figure 4:
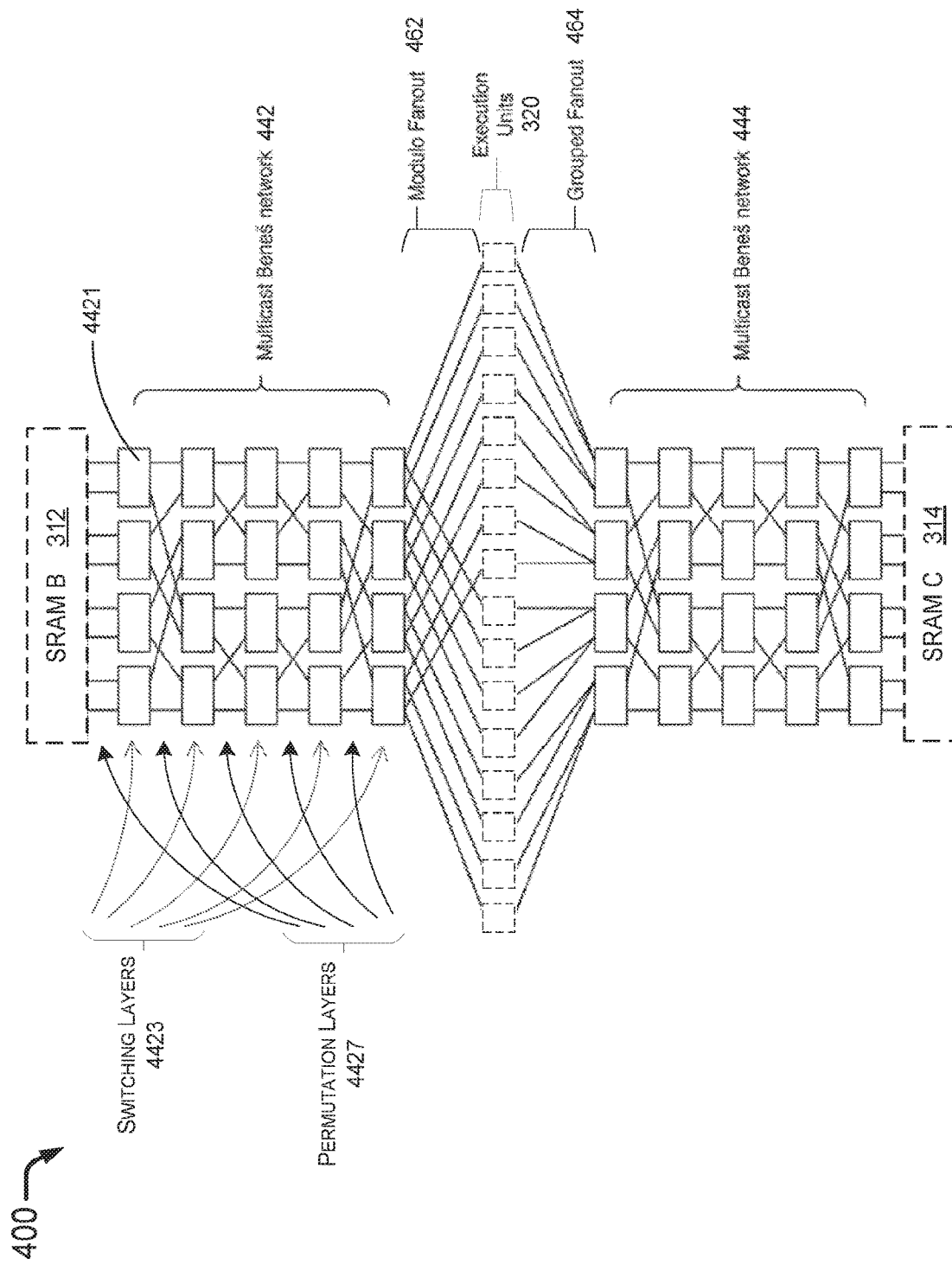
FIG. 4 is a block diagram of an example multicast network as coupled to memory banks and execution units according to the present disclosure.

FIG. 4 illustrates a block diagram of an example multicast network 400 as coupled to memory banks 312 and 314 and execution units 320 according to the present disclosure. At a high level, multicast network 400 moves data from a fixed SRAM bus of SRAM 312 and 314 to a fixed set of execution units 320, with support for reordering and/or duplicating values. In an embodiment where there are two independent SRAM banks in the memory system (e.g., the B side and the C side as shown in FIG. 4), two independent multicast Beneš networks 442 and 444 are employed, one for each of the SRAM banks. The two multicast Beneš networks 442 and 444 may have a slight asymmetry, which makes them appropriate for row/column use cases.

As shown in FIG. 4, multicast Beneš networks 442 and 444 are employed to transfer data from SRAM 312 and 314 into the fanout networks (i.e., the "Modulo Fanout" network 462 and the "Grouped Fanout" network 464 as shown in FIG. 4). There Beneš networks 442 and 444 are fully general and may be arranged to set or realize any arbitrary pattern. From each of SRAM B 312 and SRAM C 314, data propagates through one of the multicast Beneš networks 442 and 444, and then a fixed fanout network (either the "Modulo Fanout" network 462 or the "Grouped Fanout" network 464) expands or otherwise converts the number of data elements from the SRAM bus width to the full width of the execution unit bus. The degree of fanout is fixed, and is generally a power of two. As shown in FIG. 4, on the B side, the output from SRAM B 312 is tiled onto the execution units 320, whereas on the C side, each of the elements from SRAM C 314 is duplicated onto the execution units 320. The fanout networks 462 and 464 are referred to as the modulo and grouped fanout units, respectively.

Most of the complexity of the multicast network lies in the Beneš networks 442 and 444. Details of Beneš networks, Beneš switch units, and the fixed fanout networks are provided below.

Beneš Network (benes_net)

A multicast Beneš network allows data read from sequential memory to be reordered and/or duplicated. It supports fully general multicast patterns, allowing all possible multicast pattern to be realized. It accepts new data every clock cycle, and outputs new data every clock cycle. It is internally pipelined with a fixed delay, and supports reconfiguration in 2 clock cycles. Reconfiguration data arrives over the normal input lines, and is signaled via control lines.

The multicast Beneš network is internally composed of a series of permutation layers (such as layers 4427 of Beneš network 442 shown in FIG. 4) and a series of switching layers (such as layers 4423 of Beneš network 442 shown in FIG. 4), with two kinds of layers alternately disposed. Each of the permutation layers is configured to realize a fixed permutation of the bus elements. The switching layers contain BENES_WIDTH/2 2×2 switching nodes, or switching units, such as numeral 4421 if FIG. 4, and each of the switching nodes holds two updatable bits containing configuration data that determines the switching function. The switching nodes are described in further detail in the Beneš switch module disclosed below.

A set of design parameters, such as the parameters shown below along with their respective default values, determine the overall size and performance of the design of each Beneš network. The default values are exemplary and may be subject to change depending on design requirements.

| Name | Default Value | Description/Formula |
|---|---|---|
| ELEM_WIDTH | 16 | Number of bits per element |
| BENES_PO2 | 11 | Power of two of switches |
| BENES_DEPTH | 23 | 2*BENES_PO2 + 1 |

-continued

| Name | Default Value | Description/Formula |
|---|---|---|
| BENES_UNITS | 2048 | POW(2, BENES_PO2) |
| BENES_WIDTH | 4096 | 2*BENES_UNITS |
| BUS_WIDTH | 65536 | ELEM_WIDTH * BENES_WIDTH |

Each multicast Beneš network may have the following set of external pins via which the multicast Beneš network is communicatively coupled to and interact with other components of the multicast network, and other components of the TPU (such as SRAM).

| Name | Width | Direction | Description |
|---|---|---|---|
| CLOCK | 1 | IN | Global Clock |
| PASSTHRU | 1 | IN | Ignore config, pass through |
| BROADCAST | 1 | IN | Ignore config, broadcast element 0 |
| SET_0 | 1 | IN | Update 0th entry of each node |
| SET_1 | 1 | IN | Update 1th entry of each node |
| DATA_IN | BUS_WIDTH | IN | Input data |
| DATA_OUT | BUS_WIDTH | OUT | Output data |

The Beneš network is composed of BENES_DEPTH*BENES_UNITS switching nodes, or switching units. Each switching unit has two inputs and two outputs. These are arranged in BENES_DEPTH layers, each layer having BENES_UNITS units across. Between layers, switches are connected to one another in a recursive pattern via the permutation layers. Specifically, the switching layers may be labeled or otherwise identified with an index, from −BENES_PO2 for the layer right after the input, to +BENES_PO2 for the final layer before the output. Call input i∈{0, 1} of unit j∈[0, BENES_UNIT S) on layer l∈[−BENES_P O2, BENES_P O2] as I (l, j, i), and the associated output as O(l, j, i). We have:

$$W(l)l=>0?2^l:2^{(-l+1)}$$

$$B(l,j)=\text{floor}(j/W(l))*W(l)$$

$$J(l,j)=j-B(l,j)$$

$$D(l,j)=\text{floor}(J(l,j)/2)$$

$$H(l,j)=\text{floor}(2*J(l,j)/W(l))$$

if(l>0):

$$I(l,j,i)=O(l-1,B(l,j)+D(l,j)+i*W(l)/2,j\%2)$$

else:

$$I(l,j,i)=O(l-1,B(l,j)+(2*j+i)\%W(l),H(l,j))$$

The global control data (PASSTHRU, BROADCAST, SET_0, SET_1) is passed to each switching node, with proper pipelining delays, so that all of the control for a single flow is passed along at the same rate as the data. In addition, each switching layer is parameterized slightly differently. Specifically, if we number each switching layer, with 0 being the layer connected directly to input, and 2*BENES_P O2 being the layer connected directly to output, we have:

CFG_ELEM=(1<ELEM_WIDTH)

CFG_BIT=(1% ELEM_WIDTH)

The operation of the Beneš network is largely a function of the topology of the Beneš network itself, the structure of the Beneš switch (i.e., Beneš _switch, as shown below), and the pipelining.

Beneš Switch Units (Benes Switch)

A set of design parameters, such as the parameters shown below along with their respective default values, determine the overall size and performance of the design of the Beneš switch units. The default values are exemplary and may be subject to change depending on design requirements.

| Name | Default Value | Description/Formula |
|---|---|---|
| ELEM_WIDTH | 16 | Number of bits per element |
| CFG_ELEM | 0 | Which element to get config from |
| CFG_BIT | 0 | Which bit to get config from |

Each multicast Beneš switching unit may have the following set of external pins via which the multicast Beneš switching unit is communicatively coupled to and interact with other components of the multicast network, and/or other components of the TPU.

| Name | Width | Direction | Description |
|---|---|---|---|
| CLOCK | 1 | IN | Global Clock |
| PASSTHRU | 1 | IN | Ignore config, pass through |
| BROADCAST | 1 | IN | Ignore config, broadcast element 0 |
| SET_0 | 1 | IN | Update 0th entry of each node |
| SET_1 | 1 | IN | Update 1th entry of each node |
| IN_0 | ELEM_WIDTH | IN | Input entry 0 |
| IN_1 | ELEM_WIDTH | IN | Input entry 1 |
| OUT_0 | ELEM_WIDTH | OUT | Output entry 0 |
| OUT_1 | ELEM_WIDTH | OUT | Output entry 1 |

Each multicast Beneš switching unit may have a plurality of registers such as ones shown below.

| Name | Width | Description |
|---|---|---|
| CFG_0 | 1 | Which input goes to output 0 |
| CFG_1 | 1 | Which input goes to output 1 |

Each multicast Beneš switching unit may operate in an always operation mode as described by the virtual code below:

if PASSTHRU:

OUT_0=IN_0

OUT_1=IN_1 else if BROADCAST:

OUT_0=IN_0

OUT_1=IN_0 else:

OUT_0=(CFG\_0?IN_1:IN_0)

OUT_1=(CFG\_1?IN_1:IN_0)

cfg_bit=(CFG_ELEM?IN_1:IN_0)[CFG_BIT]

Each multicast Beneš switching unit may further operate in a clocked operation mode as described by the virtual code below:

if SET_0:

CFG_0'=cfg_bit if SET_1:

CFG_1'=not cfg_bit

It is worth noting that, during normal configuration operation, PASSTHRU is held while SET_0 and then SET_1 as each set. If the network is being set to a pure permutation, SET_0 and SET_1 can both be set, resulting in a single cycle update. Also, passthru behavior or broadcast behavior can be activated without updating the network.

Modulo Fanout (mod_fanout)

A set of design parameters, such as the parameters shown below along with their respective default values, determine the overall size and performance of the design of the modulo fanout network 462. The default values are exemplary and may be subject to change depending on design requirements.

| Name | Default/Value | Description/Formula |
|---|---|---|
| ELEM_WIDTH | 16 | Number of bits per element |
| IN_ELEMS | 4096 | Number of input elements |
| IN_WIDTH | 65536 | IN_ELEMS * ELEM_WIDTH |
| OUT_ELEMS | 131072 | Number of output elements |
| OUT_WIDTH | 2097152 | OUT_ELEMS * ELEM_WIDTH |

The modulo fanout network may have the following set of external pins via which the modulo fanout network 462 is communicatively coupled to and interact with EUs, a multicast Beneš network, and/or other components of the TPU.

| Name | Width | Direction | Description |
|---|---|---|---|
| IN | IN_WIDTH | IN | Input data |
| OUT | OUT_WIDTH | OUT | Output data |

Basically, the mod_fanout module is pure wiring. That is:

OUT[$i$]=IN[$i$ % IN_ELEMS]

Grouped Fanout (Group Fanout)

The grouped fanout network 464 is identical to the modulo fanout network 462, except the output elements of the grouped fanout network are defined as:

OUT[$i$]=IN[floor($i$/(OUT_ELEMS/IN_ELEMS))]

Indexing: Counter Unit and Addressing Unit

The process of looping over indexes (usually dimensions of a tensor) and computing a memory address or other variable based on the values of the tensor is a common process of many TPU components. To provide support for this activity, we define here two units: a multidimensional counter unit and a multidimensional addressing unit. Specifically, the counter unit tracks the current value of the set of indexes in use, while the addressing unit keeps up-to-date addresses including a modulo offset. Details of the two units are given below.

Multidimensional Counter Unit (mdim_count)

The counter unit provides the actual loop iteration mechanism used by other indexing components. A set of design parameters, such as the parameters shown below along with their respective default values, determine the overall size and performance of the design of the counter unit. The default values are exemplary and may be subject to change depending on design requirements.

| Name | Default Value | Description/Formula |
|---|---|---|
| IDX_COUNT | 16 | Number of indexes in the counter |
| IDX_WIDTH | 16 | Number of bits per index |
| IDX_SEL | 4 | ceil(log2(IDX_COUNT)) |
| IDX_BUS | 256 | IDX_COUNT * IDX_WIDTH |

The counter unit may have the following set of external pins via which the counter unit is communicatively coupled to and interact with other components of the TPU.

| Name | Width | Direction | Description |
|---|---|---|---|
| CLK | 1 | IN | Global clock |
| RST | 1 | IN | Reset |
| CFG | 1 | IN | Configure counter sizes |
| STEP | 1 | IN | Step enable |
| CFG_IN | IDX_BUS | IN | Configuration input |
| OVER | 1 | OUT | Would the next step wrap the 0'th index |
| NEXT | IDX_SEL | OUT | Which index will decrement next step |

The operation of the counter unit is described as follows. Internally, the multidimensional counter unit retains IDX_COUNT counters, each IDX_WIDTH bits long. Call counter i, C[i]. In addition, the multidimensional counter unit contains IDX_COUNT sizes, each IDX_WIDTH bits long, called S[i]. At each clock, the following logic occurs (where C[i] and S[i] represent the pre-clock value of the counters and the sizes, respectively, and C'[i] and S'[i] represent the new value thereof).

```
if RST is high:
    For all i, C'[i] = 0 and S'[i] <= 0
else if CFG is high:
    For all i, C'[i] = CFG_IN[i], S'[i] = CFG_IN[i]
else if STEP is high:
    For all i:
        if i > NEXT or OVER == 1, C'[i] = S[i]
        else if i == NEXT, C'[i] = C[i] - 1
if for all i, C'[i] == 0:
    OVER' = 1
    NEXT' = 0
else:
    OVER' = 0
    NEXT' = max(i) such that C'[i] != 0
```

For example, given IDX_COUNT of 4, the following table illustrates the behavior of the multidimensional counter unit, where each row represents one clock cycle. The first 4 columns represent the input values prior to the clock, the next 8 columns represent the updated value of the registers (C', S') after the clock, and the final 2 columns represent the outputs after the clock edge. Signal names have been abbreviated to reduce column width (e.g., R is the abbreviation of RST, C is the abbreviation of CFG, S is the abbreviation of STEP, O is the abbreviation of OVER, and N is the abbreviation of NEXT).

| R | C | S | CFG_IN | S0 | S1 | S2 | S3 | C0 | C1 | C2 | C3 | O | N |
|---|---|---|--------|----|----|----|----|----|----|----|----|---|---|
| 1 | X | X | X      | X  | X  | X  | X  | X  | X  | X  | X  | X | X |
| 0 | 0 | 0 | X      | 0  | 0  | 0  | 0  | 0  | 0  | 0  | 0  | 1 | 0 |
| 0 | 0 | 1 | X      | 0  | 0  | 0  | 2  | 0  | 0  | 0  | 0  | 1 | 0 |
| 0 | 1 | 0 | 3, 1, 0, 2 | 3 | 1 | 0 | 2 | 3 | 1 | 0 | 2 | 0 | 3 |
| 0 | 0 | 1 | X      | 3  | 1  | 0  | 2  | 3  | 1  | 0  | 1  | 0 | 3 |
| 0 | 0 | 1 | X      | 3  | 1  | 0  | 2  | 3  | 1  | 0  | 0  | 0 | 1 |
| 0 | 0 | 1 | X      | 3  | 1  | 0  | 2  | 3  | 0  | 0  | 2  | 0 | 3 |
| 0 | 0 | 1 | X      | 3  | 1  | 0  | 2  | 3  | 0  | 0  | 1  | 0 | 3 |
| 0 | 0 | 1 | X      | 3  | 1  | 0  | 2  | 3  | 0  | 0  | 0  | 0 | 0 |
| 0 | 0 | 1 | X      | 3  | 1  | 0  | 2  | 2  | 1  | 0  | 2  | 0 | 3 |
| 0 | 0 | 1 | X      | 3  | 1  | 0  | 2  | 2  | 1  | 0  | 1  | 0 | 3 |
| 0 | 0 | 1 | X      | 3  | 1  | 0  | 2  | 2  | 1  | 0  | 0  | 0 | 1 |
| 0 | 0 | 1 | X      | 3  | 1  | 0  | 2  | 2  | 0  | 0  | 2  | 0 | 3 |
| . | . | . | .      | .  | .  | .  | .  | .  | .  | .  | .  | . | . |
| . | . | . | .      | .  | .  | .  | .  | .  | .  | .  | .  | . | . |
| . | . | . | .      | .  | .  | .  | .  | .  | .  | .  | .  | . | . |
| 0 | 0 | 1 | X      | 3  | 1  | 0  | 2  | 0  | 1  | 0  | 1  | 0 | 3 |
| 0 | 0 | 1 | X      | 3  | 1  | 0  | 2  | 0  | 1  | 0  | 0  | 0 | 1 |
| 0 | 0 | 1 | X      | 3  | 1  | 0  | 2  | 0  | 0  | 0  | 2  | 0 | 3 |
| 0 | 0 | 1 | X      | 3  | 1  | 0  | 2  | 0  | 0  | 0  | 1  | 0 | 3 |
| 0 | 0 | 1 | X      | 3  | 1  | 0  | 2  | 0  | 0  | 0  | 0  | 1 | 0 |
| 0 | 0 | 1 | X      | 3  | 1  | 0  | 2  | 3  | 1  | 0  | 2  | 0 | 3 |

Figure 5:
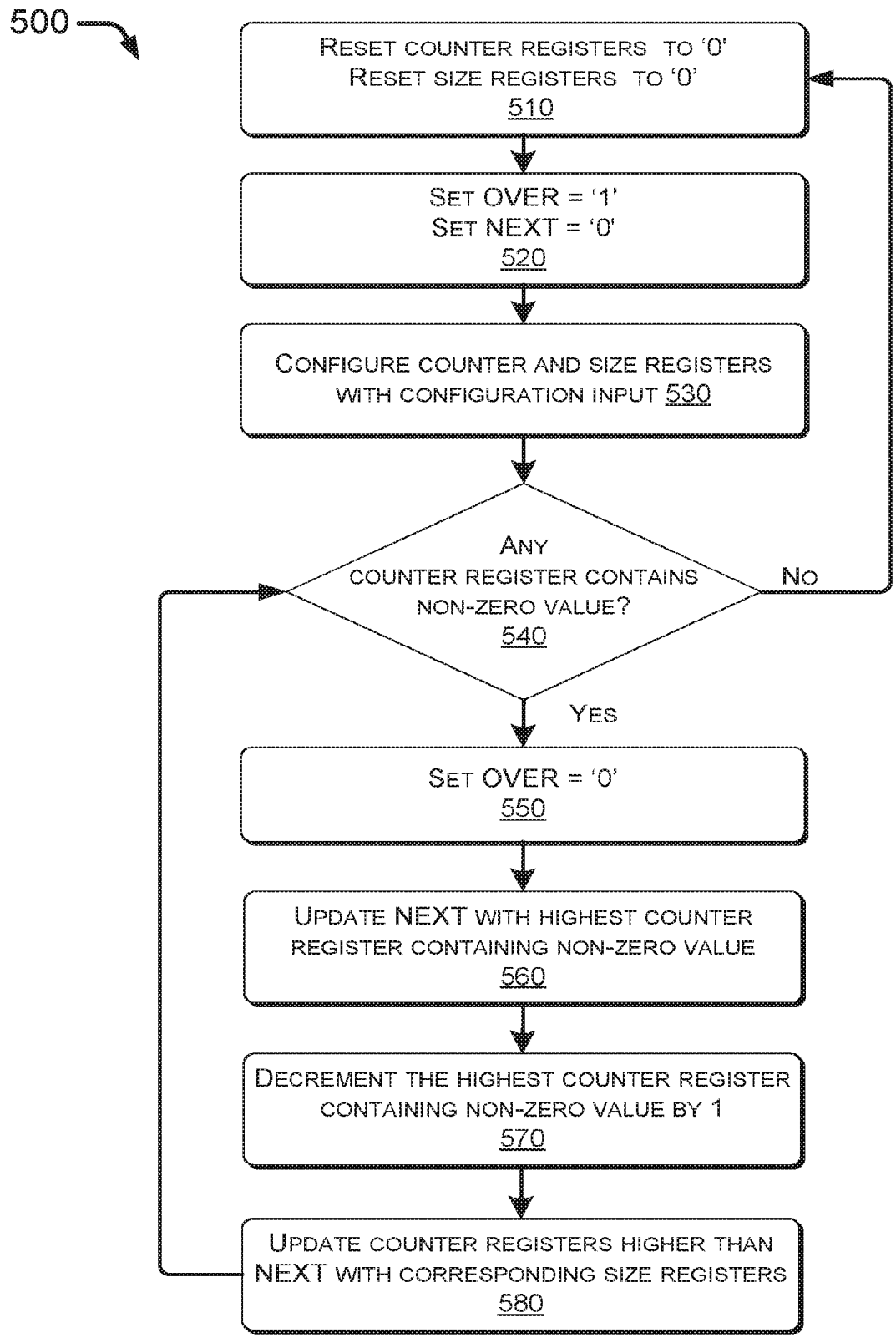
FIG. 5 is a flow chart for an exemplary operation of an indexing module according to the present disclosure.

FIG. 5 is a flow chart showing the operation process of the example above. To clarify the flow, the logical order will be described here, but multiple independent steps may be scheduled on the same clock cycle, and some steps may take more than one clock cycle, with internal pipeline latches. As shown in FIG. 5, process 500 may start from block 510.

At block 510, process 500 may involve resetting counter registers C[0]-C[3] to '0' and size registers S[0]-S[3] also to '0'. Process 500 may proceed from block 510 to block 520.

At block 520, process 500 may involve setting OVER register to '1' and NEXT register to '0'. Process 500 may proceed from block 520 to block 530.

At block 530, process 500 may involve configuring counter registers C[0]-C[3] and size registers S[0]-S[3] are configured according to configuration input CFG_IN, which is '3, 1, 0, 2' in the example above. Process 500 may proceed from block 530 to block 540.

At block 540, process 500 may involve determining whether any of counter registers C[0]-C[3] contains a non-zero value. In response to determining that at least one of counter registers C[0]-C[3] contains a non-zero value, process 500 may proceed from block 540 to block 550. On the other hand, in response to determining that each of counter registers C[0]-C[3] contains a zero value, process 500 may proceed from block 540 to block 510.

At block 550, process 500 may involve setting OVER register to '0'. Process 500 may proceed from block 550 to block 560.

At block 560, process 500 may involve updating the NEXT register based on a counter register of a highest sequence that contains a non-zero value. For example, in the $4^{th}$ row of the table above, the NEXT register is updated as '3', as the highest-sequence counter register that contains a non-zero value is register C[3], which contains '2', a non-zero value. As another example, in the $6^{th}$ row of the table above, the NEXT register is updated as '1', as the highest-sequence counter register that contains a non-zero value is register C[1] (noting that each of C[2] and C[3] contains '0'), which contains '1', a non-zero value. Process 500 may proceed from block 560 to block 570.

At block 570, process 500 may involve decrementing the non-zero value of the highest-sequenced counter register by 1. For example, in the $5^{th}$ row of the table above, C[3] is decremented from '2' (as shown in the $4^{th}$ row) to '1'. Process 500 may proceed from block 570 to block 580.

At block 580, process 500 may involve updating counter registers having a higher sequence than specified by the NEXT register with the corresponding size registers. For example, given that in the $6^{th}$ row of the table above the NEXT register has been updated as '1', in the $7^{th}$ row of the table, both counter registers C[2] and C[3] are updated according to size registers S[2] and S[3], respectively. That is, in the $7^{th}$ row of the table, C[2] is set to have the same value of S[2] (which is '0'), and C[3] is set to have the same value of S[3] (which is '2'), respectively. Process 500 may loop back from block 580 to block 540.

As process 500 goes on following the flow chart of FIG. 5, process 500 may repeat blocks 540, 550, 560, 570 and 580 for many times in a loop, until every counter register contains '0', as shown in the second-to-last row of the table above. As can be seen in the last row of the table above, the tensor indexes are "looped over" in the process, as the last row becomes identical to the $4^{th}$ row of the table. As the process continues, the indexes stored in the counter registers may continue changing, i.e., the multidimensional counter unit may loop over the indexes for many times.

Multidimensional Address Unit (mdim_addr)

The multidimensional address unit adjusts an address based on the index which is changing due to operation of the multidimensional counter as described above. It allows an address to be an arbitrary polynomial of it's indexes, and tracks both the quotient and the reminder when divided by a fixed modulus. This operation is performed without the need for multiplication or division circuits, since each step can be done via addition.

A set of design parameters, such as the parameters shown below along with their respective default values, determine the overall size and performance of the design of the address unit. The default values are exemplary and may be subject to change depending on design requirements.

| Name       | Default Value | Description/Formula |
|------------|---------------|---------------------|
| IDX_COUNT  | 16            | Number of indexes   |
| IDX_SEL    | 4             | ceil(log2(IDX_COUNT)) |
| DIVISOR    | 4192          | 131 (# of banks) * 32 (bank size) |
| REM_WIDTH  | 13            | ceil(log2(DIVISOR)) |
| QUOT_WIDTH | 19            | Number of bits per address quotient |
| ADDR_WIDTH | 37            | QUOT_WIDTH + REM_WIDTH |
| DELTA_BUS  | 512           | IDX_COUNT * ADDR_WIDTH |

The address unit may have the following set of external pins via which the address unit is communicatively coupled to and interact with other components of the TPU.

| Name     | Width      | Direction | Description |
|----------|------------|-----------|-------------|
| CLK      | 1          | IN        | Global clock |
| RST      | 1          | IN        | Reset |
| CFG      | 1          | IN        | Configure address deltas |
| STEP     | 1          | IN        | Step enable |
| IDX      | IDX_SEL    | IN        | Which index to step |
| QUOT_IN  | QUOT_WIDTH | IN        | Quotient of initial address during config |
| REM_IN   | REM_WIDTH  | IN        | Remainder of initial address during config |
| DELTA_IN | DELTA_BUS  | IN        | Delta Configuration input |
| QUOT     | QUOT_WIDTH | OUT       | The address quotient for this index state |
| REM      | REM_WIDTH  | OUT       | The address remainder for this index state |

The operation of the address unit is described as follows. Internally, the multidimensional address unit retains address components in registers QUOT and REM which are also the outputs. It also holds deltas, which are composed of a quotient delta DQ[i], and a remainder delta DR[i], for each of 0<=i<IDX_COUNT indexes. Based on the selected index, it updates the address by adding the deltas. At each clock, the following logic occurs (where X represents the pre-clock value of X, and X' represents the new value).

```
if RST is high:
   For all i, DQ'[i] = 0, DR'[i] = 0
   QUOT' = 0, REM' = 0
else if CFG is high:
   For all i, DQ'[i] = DELTA_IN[i].Q, DR'[i] = DELTA_IN[i].R
   QUOT' = QUOT_IN, REM' = REM_IN
else if STEP is high:
   Q_TMP = QUOT + DQ[IDX]
   R_TMP = REM + DR[IDX]
   OVFLOW = (R_TMP > DIVISOR)
   QUOT' = OVFLOW ? Q_TMP + 1 : Q_TMP
   REM' = OVFLOW ? R_TMP - DIVISOR : R_TMP
   ADDR' = ADDR + D[IDX]
```

Notably, if the desired clock speed and address width preclude single cycle operation, operations may be pipelined via the use of methods such as carry-save. This will result in the QUOT and REM outputs to update every cycle, but with a fixed pipeline delay on the output.

Bank Permutation Network

When accessing (that is, writing to memory or retrieving from memory) a vector of N data elements, the addresses of the N data elements often take the form:

$$A[i]=O+M*i$$

Where O is some base address offset, M is a multiplier, and i is an index $0<=i<N$. When the memory is divided into D banks, and each element is of full bank width and properly aligned, the banks being read from for each i are:

$$B[i]=(O+M*i) \% D$$

If the number of banks, D, is relatively prime to M, and $N<=D$, there will be no bank conflicts. If D is prime, so long as M is not a strict multiple of D, D and M will be relatively prime. It is presumed hereafter that D is in fact prime relatively to M.

Figure 6:
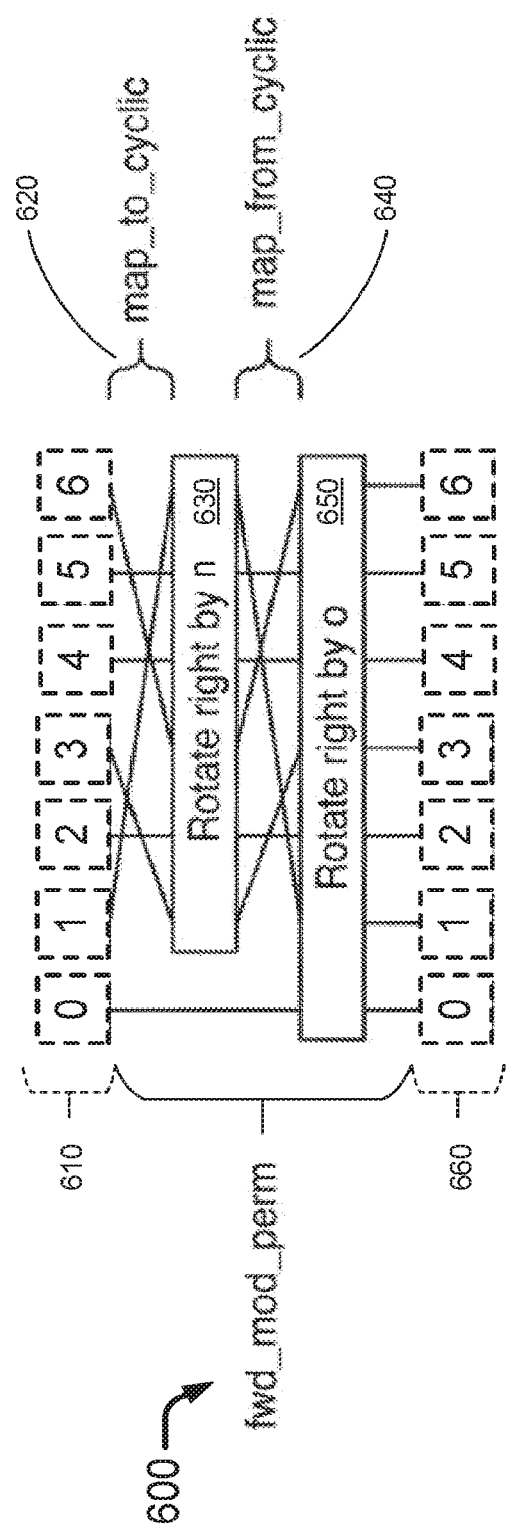
FIG. 6 is a block diagram of an example forward modulo permutation network according to the present disclosure.
Figure 7:
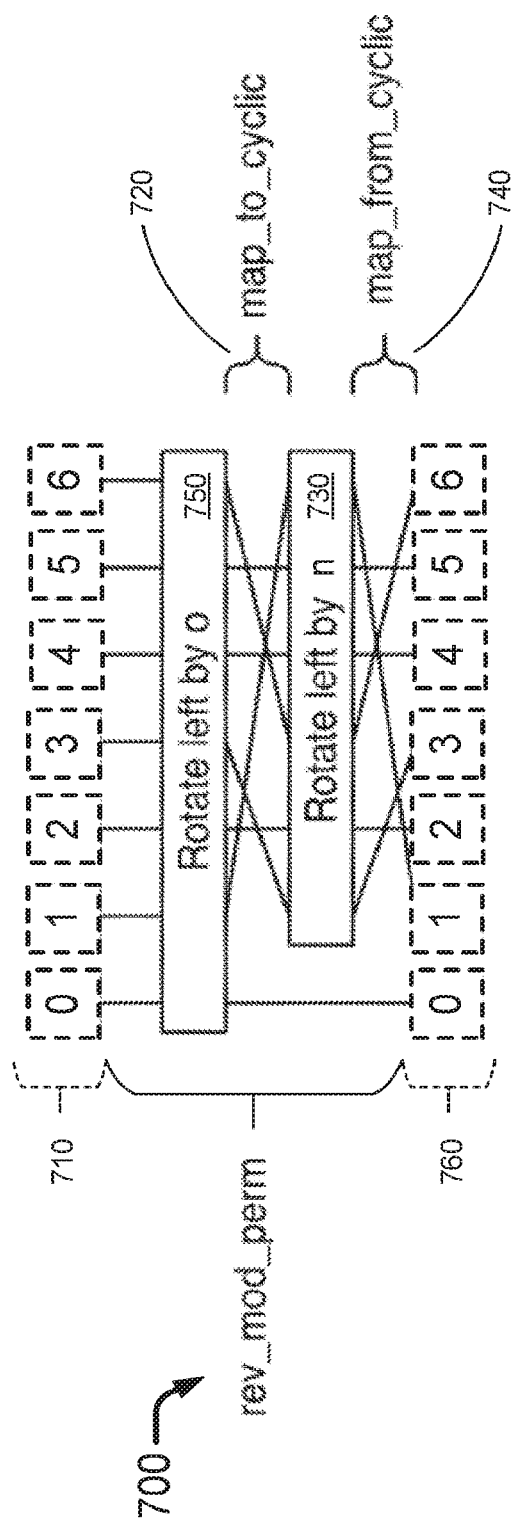
FIG. 7 is a block diagram of an example reverse modulo permutation network according to the present disclosure.

Given such an access pattern, a bank permutation network, such as bank permutation network 600 of FIG. 6 or bank permutation network 700 of FIG. 7, is employed to provide a way to permute the request addresses (for memory write operations) such that each request is routed to the proper memory bank so that each entry is in the order of i. Alternatively, the bank permutation network may be configured to permute the addresses such that the read results (for memory read operations) are routed back, so that each entry is in the order of i.

It is to be noted that, given o=O % D and m=M % D, the permutation is completely defined where O is the offset, M is the multiplier, and D is the number of banks In general, the addition component (called x) can be induced by a simple shift (or rotate). For prime D, the multiplication permutation can be induced by a fixed permutation, a shift (or rotate), and another fixed permutation. This is because for a prime number, the multiplicative group is isomorphic to the cyclic group D−1. The first permutation maps each entry to a cyclic order, and the second permutation undoes that mapping. Also, it is to be noted that a cyclic shift, or a shift in a cyclic space, is sometimes referred to as "rotation", which is typically performed by a barrel shifter/rotator hardware, such as barrel rotators 630 and 650 of FIG. 6 and barrel rotators 730 and 750 of FIG. 7.

To define these permutations, we must choose a generator over the multiplication prime field in question. A generator for a group is an element that, by repeated applications, produces all the elements of the group. For example, for the prime field over D=7, 3 is a multiplicative generator:

$$3^1 (\text{mod } 7)=3$$

$$3^2 (\text{mod } 7)=2$$

$$3^3 (\text{mod } 7)=6$$

$$3^4 (\text{mod } 7)=4$$

$$3^5 (\text{mod } 7)=5$$

$$3^6 (\text{mod } 7)=1$$

The chosen generator is denoted as g. Note that D and g are fixed at the time of design. A discrete log with respect to g, $\log_g(x)$, can be defined as the value y such that $g^y$ (mod D)=x. For example, for g=3, D=7, we compute $\log_g(6)=3$.

Since the rotation to handle the multiplicative part of the permutation happens in the cyclic space, it is required to compute the discrete log to determine the amount to rotate, which is complex to perform in hardware. In practical implementations, one may presume that M, and thus in, and $\log_g$ (in) are known in advance. This allows a compiler to perform the appropriate computations and provide a fixed constant for the rotation. Specifically, to determine the necessary rotation, we compute:

$$n=(\log_g(m)+1) \% (D-1)$$

Namely, to specify a transform, o and r are provided at the time of permutation. It is to be noted that the permutation network may be configured to one of two different variants. The first variant is called the forward modulo permutation network, or fwd_mod_perm 600 as shown in FIG. 6, which maps each i<D to a correspondingly appropriate bank position b=(O+M*i) % D given the correct o and n. This permutation is used to send address and data to the memory banks (i.e., for memory write operations). The second variant is called the reverse modulo permutation network, or rev_mod_perm 700 as shown in FIG. 7, which simply performs the inverse mapping of fwd_mod_perm, and is used to appropriately reorder the read data elements due to memory read operations.

Before fwd_mod_perm and rev_mod_perm modules can be described in greater detail below, two simple wiring patterns are to be defined. The two wiring patterns are used to perform the mapping a logical group and a cyclic group. Specifically, a first wiring pattern, map_to_cylic (such as numeral 620 of FIG. 6 and 720 of FIG. 7), is defined to take D−1 elements and map each entry i of the D−1 elements to entry $\log_g(i)$, for $1<=i<D$. A second wiring pattern, map_from_cylic (such as numeral 640 of FIG. 6 and 740 of FIG. 7), is defined to do the opposite and map entry i to entry $g^i$ (mod D). Since 0 is not a member of the multiplicative group, entry 0 of the elements is left unaltered by both the mapping and the rotations.

An example design for the forward and reverse permutation networks for D=7, g=3 is shown in FIGS. 6 and 7, respectively. The permutation networks are individually described in greater detail below.

Forward Modulo Permutation Network (fwd_mod_perm)

The forward modulo permutation network 600 of FIG. 6 operates to permute elements 610 with addresses of the form O+M*i to the proper memory banks. A set of design parameters, such as the parameters shown below along with their respective default values, determine the overall size and performance of the forward modulo permutation network 600. The default values are exemplary and may be subject to change depending on design requirements.

| Name | Default Value | Description/Formula |
|---|---|---|
| DIVISOR | 7 | Prime group |
| GENERATOR | 3 | Generator for prime group |
| REM_WIDTH | 3 | cell(log2(DIVISOR)) |
| WIDTH | 32 | Data width for data to be permuted |
| BUS_WIDTH | 224 | D * WIDTH |

The forward modulo permutation network 600 may have the following set of external pins via which the forward modulo permutation network 600 is communicatively coupled to and interact with other components of the TPU.

| Name | Width | Direction | Description |
|---|---|---|---|
| CLK | 1 | IN | Global clock |
| RST | 1 | IN | Global Reset |
| O | REM_WIDTH | IN | Offset modulo D |
| N | REM_WIDTH | IN | Precomputed cyclic shift |
| IN | BUS_WIDTH | IN | Input lines |
| OUT | BUS_WIDTH | OUT | Output lines |

The input, IN, of the forward modulo permutation network is treated as DIVISOR entries, IN[i], each of WIDTH elements wide. The output, OUT, is treated as DIVISOR entries, OUT[i]. The behavior of the network is as follows, where D=DIVISOR, G=GENERATOR:

TO_CYC[$i$]=IN[($G^{\wedge}(i+1)$)% $D$], for $0<=i<D-1$

ROT_CYC[$i$]=TO_CYC[($i+N$) % ($D-1$)], for $0<=i<D-1$

TO_MUL[$i$]=TO_CYC[log $G(i+1)$], for $0<=i<D-1$

OFF[0]=IN[0]

OFF[$i$]=TO_MUL[$i-1$], for $1<=i<D$

OUT[$i$]=OFF[($i+O$) % $D$], for $0<=i<D$

The above description of the forward modulo permutation network presumes that the logic is purely combinatorial and takes 0 clock cycles to complete. In practice, it is likely that the permutation network may require pipelining. Namely, the output follows the inputs with some fixed clock cycle delay. In this case, the reset line results in the output for the otherwise undefined clock cycles being all 0s.

Reverse Modulo Permutation Network (rev_mod_perm)

The reverse modulo permutation network 700 operates to permute elements with addresses of the form O+M*i from the proper memory banks back to the original logical order. A set of design parameters, such as the parameters shown below along with their respective default values, determine the overall size and performance of the reverse modulo permutation network 700. The default values are exemplary and may be subject to change depending on design requirements.

| Name | Default Value | Description/Formula |
|---|---|---|
| DIVISOR | 7 | Prime group |
| GENERATOR | 3 | Generator for prime group |
| REM_WIDTH | 3 | ceil(log2(DIVISOR)) |
| D_BITS | 3 | Number of bits to represent size of banks D |
| WIDTH | 32 | Data width for data to be permuted |
| BUS_WIDTH | 224 | D * WIDTH |

The reverse modulo permutation network 700 may have the following set of external pins via which the reverse modulo permutation network 700 is communicatively coupled to and interact with other components of the TPU.

| Name | Width | Direction | Description |
|---|---|---|---|
| CLK | 1 | IN | Global clock |
| RST | 1 | IN | Global Reset |
| O | D_BITS | IN | Offset modulo D |
| N | D_BITS | IN | Precomputed cyclic shift |
| IN | BUS_WIDTH | IN | Input lines |
| OUT | BUS_WIDTH | OUT | Output lines |

The input, IN, of the reverse modulo permutation network is treated as DIVISOR entries, IN[i], each of WIDTH elements wide. The output, OUT, is treated as DIVISOR entries, OUT[i]. The behavior of the network is as follows, where D=DIVISOR, G=GENERATOR:

OFF[$i$]=IN[($i-O$) % $D$], for $0<=i<D$

TO_CYC[$i$]=OFF[($G^{\wedge}(i+1)$)% $D$], for $0<=i<D-1$

ROT_CYC[$i$]=TO_CYC[($i-N$) % ($D-1$)], for $0<=i<D-1$

TO_MUL[$i$]=TO_CYC[log $G(i+1)$], for $0<=i<D-1$

OUT[0]=OFF[0]

OUT[$i$]=TO_MUL[$i-1$], for $1<=i<D$

The above description of the reverse modulo permutation network presumes that the logic is purely combinatorial and takes 0 clock cycles to complete. In practice, it is likely that the permutation network may require pipelining. Namely, the output follows the inputs with some fixed clock cycle delay. In this case, the reset line results in the output for the otherwise undefined clock cycles being all 0s.

The forward and reverse modulo permutation networks 600 and 700 described above may work together with a modulo address generator to complete the task of address permutation. The modulo address generator is described below.

Modulo Address Generator (mod_addr)

The goal of the modulo address generator (mod_addr) is to produce and properly "bank" a vector addresses, given an offset and a multiplier, as well as vector size. In some embodiments, the memory of the TPU may have a number of memory banks, D, where D is prime, with a logical layout of modulo D. When accessing the memory, it is desired to read a vector with a fixed stride from logical memory. Specifically, for an offset O, a multiplier M, and a length L<=D, a set of addresses may be defined as:

$A[i]=O+M*i, O<=i<L$

In addition, each address must be send to an appropriate corresponding bank, where the corresponding bank for A[i] is A[i] % D, and the internal address within that bank is A[i]/D. The goal of the mod_addr unit is to produce, for each bank, the bank internal address and an enable flag for the respective bank.

Because in the common use case, M remains fixed for a large number of cycles while O and L change, and because changes to M require multiplication, the mod_addr module has a configuration mechanism to change M, while O and L can be changed on a per clock basis. To avoid a need for division, O is typically provided in the format of a quotient and a remainder relative to D, which the various indexing units produce. That is, O=Q*D+R, where 0<=R<D. The multiplier M is also provided in a quotient-remainder form (e.g., QM and RM), as this limits the size of division required to ceil(log 2(D)) bits, and also allows an implementation using serial addition. That is, one may define M=QM*D+RM, where again, 0<=R<D. In addition, as introduced previously, a precomputed cyclic shift based on M, CSHIFT=(log$_g$(M)+1)% (D−1), may be defined for generator g.

It is worth noting that mod_addr employs mechanism used by fwd_mod_perm and rev_mod_perm defined above.

A set of design parameters, such as the parameters shown below along with their respective default values, determine the overall size and performance of the modulo address generator. The default values are exemplary and may be subject to change depending on design requirements.

| Name | Default Value | Description/Formula |
| --- | --- | --- |
| DIVISOR | 7 | The divisor, D, a prime |
| GENERATOR | 3 | Generator for prime group |
| REM_WIDTH | 3 | ceil(log2(DIVISOR + 1)) |
| PHY_WIDTH | 16 | Physical (per bank) address bit width |
| ADDR_BUS | 112 | DIVISOR * PHY_WIDTH |

The modulo address generator may have the following set of external pins via which the counter unit is communicatively coupled to and interact with other components of the TPU.

| Name | Width | Direction | Description |
| --- | --- | --- | --- |
| CLK | 1 | IN | Global clock |
| RST | 1 | IN | Global Reset |
| CFO | 1 | IN | Configuration enable |
| CFG_OK | 1 | OUT | Configuration complete |
| MULT_Q | PHY_WIDTH | IN | Quotient of M/D for config |
| MULT_R | REM_WIDTH | IN | Remainder of M/D for config |
| CSHIFT | REM_WIDTH | IN | Precomputed cyclic shift for config |
| OFF_Q | PHY_WIDTH | IN | Quotient of O/D |
| OFF_R | REM_WIDTH | IN | Remainder of O/D |
| L | REM_WIDTH | IN | Length |
| OUT | ADDR_BUS | OUT | Per bank addressing |
| OUT_EN | DIVISOR | OUT | Per bank enable |

The mod_addr module contains two submodules of type fwd_mod_perm, named "addr_perm" and "enable_perm", respectively. The DIVISOR and GENERATOR parameters of these modules are set to the same values as the mod_addr module. The WIDTH parameter of the "addr_perm" module comes from the PHY_WIDTH parameter, and the WIDTH of the "enable_perm" module is 1. Since both submodules always receive the same N and O values, it is also possible to use a single fwd_mod_perm submodule with a WIDTH of PHY_WIDTH+1, but for the sake of clarity, two submodules are presumed hereafter.

The mod_addr module contains internal registers that hold a quotient-remainder representation of i*M for each i, 0<=i<D. The registers are referred to as MO_Q[i] and MO_R[i], respectively. The addition of these values with the current input offset are stored in address registers, A[i], each of PHY_WIDTH. The enable lines live in enable registers, E[i]. In addition, the cyclic shift is saved in the N register, and current offset lives in the O register. Finally, since the configuration may take multiple clock cycles to complete, there is a CFG_CYCLE counter which counts down till configuration completion.

The operation of the modulo address generator may be described by the virtual code below. In the virtual code, X' represents the value of X after the clock, and any registers not modified explicitly are assumed to remain the same.

```
always:
    *_perm.CLK = CLK
    *_perm.RST = RST
    *_perm.N = N
    *_perm.O = O
    addr_perm.IN = A[i]
    enable_perm.IN = E[i]
    OUT = addr_perm.OUT
    OUT_EN = enable_perm.OUT
    CFG_OK = CFG_CYCLE == 0
if RST is high:
    For all i, MO_Q[i] = 0
    For all i, MO_R[i] = i
    For all i, E[i] = 0
    For all i, A[i] = 0
    N' = 0
    CFG_CYCLE' = 0
    enable_perm.IN = all 0's
else if CFG is high and CFG_CYCLE = 0:
    CFG_CYCLE' = config time
    For all i, E[i] = 0
    For all i, A[i] = 0
    Begin configuration, eventually resulting in:
        MO_Q'[i] = MULT\_Q*i + floor(MULT_R*i/DIVISOR)
        MO_D'[i] = MULT_R*i%DIVISOR
        N' = SHIFT
        enable_perm.IN = all 0's
else if CFG_CYCLE != 0:
    CFG_CYCLE' = CFG_CYCLE − 1
    enable_perm.IN = all 0's
else:
    O' = OFF\_R
    For all i
        E[i]' = (i < L)
        A[i]' = OFF_Q[i]+MO_Q[i]+(OFF_R[i]+MO_R[i] >= DIVISOR:1:0)
```

The output values may lag the input values by a pipeline depth induced by the internal registers of the mod_addr module as well as the pipeline delay induced by the fwd_mod_perm module.

DRAM Controller

DRAM reads and writes are initiated from the memory transfer engine, which is described in a later part of the present disclosure. The memory transfer engine utilizes an abstraction which performs reads of two-dimensional tensor slices. The DRAM read of two-dimensional tensor slices is logically divided into two problems. First, it is desired to reads up to N reads of full bank width at some fixed stride and variable offset, where N is less than or equal to the number of banks. Second, it is desired to read up to the full bank width of banks elements, so that the resulting tensor is square, and thus amenable to transposition. In addition, it is required to deal with the non-deterministic nature of DRAM for the reads and writes, with the assumption that each bank operates independently. Therefore, the employment of a queuing technique may be beneficial.

DRAM Bank Read Unit (Dram Bank Read)

Figure 8:
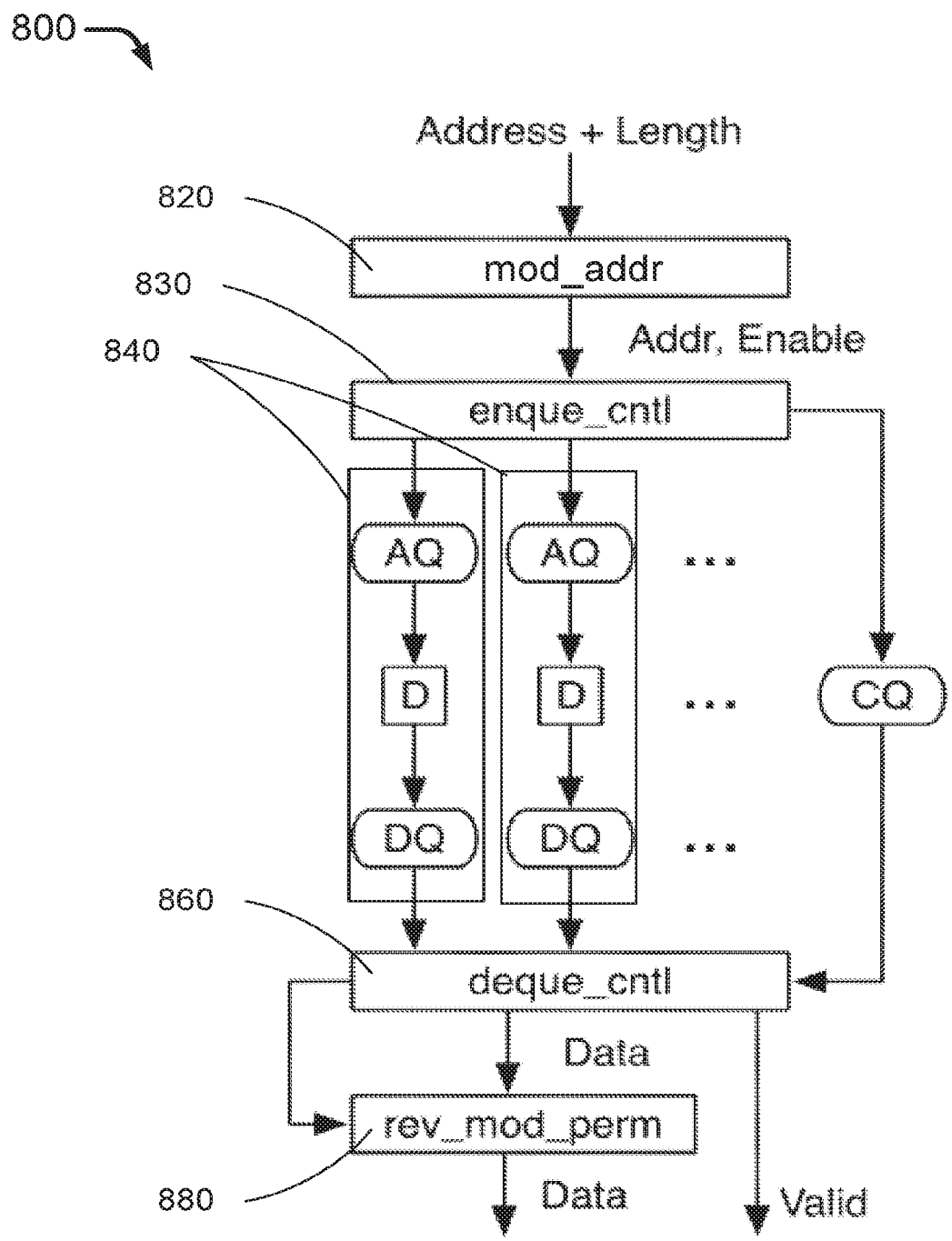
FIG. 8 is a block diagram of an example dynamic random access memory (DRAM) bank read unit according to the present disclosure.

The overall design of the DRAM bank read unit is shown in FIG. 8. Logic is shown in rectangles, and queues are shown in ovals therein. At a very high level, vector address requests are generated and bank permuted appropriately, and put into queues for DRAM to fetch from. DRAM fetches are performed independently (and possibly asynchronously) per bank, and the results are enqueued until all data is available, at which point the permutation is undone and the data gathered. This results in a VALID signal (as shown in FIG. 8) going high. Up to MAX_QUEUE requests may exist with the dram_bank_read unit simultaneously, and each request's response is returned in identical order. However, the specific number of cycles each request takes is subject to queueing and DRAM non-determinacy.

A set of design parameters, such as the parameters shown below along with their respective default values, determine the overall size and performance of the design of the DRAM bank read unit 800. The default values are exemplary and may be subject to change depending on design requirements.

| Name | Default Value | Description/Formula |
| --- | --- | --- |
| DIVISOR | 11 | Number of banks, i.e., bank divisor, must be prime |
| GENERATOR | 2 | Generator for multiplicative group of DIVISOR |
| BANK_WIDTH | 32 | Width of single bank (in elements) |
| PHY_WIDTH | 28 | Physical (per bank) address bit width |
| ELEM_WIDTH | 16 | Bit width of an element |
| MAX_QUEUE | 48 | Maximum queue size |
| REM_WIDTH | 4 | ceil(log2(DIVISOR)) |
| LEN_WIDTH | 4 | ceil(log2(DIVISOR + 1)) |
| DBUS_WIDTH | 5632 | DIVISOR * BANK_WIDTH * ELEM_WIDTH (Data bus width) |

The DRAM bank read unit 800 may have the following set of external pins via which the DRAM bank read unit 800 is communicatively coupled to and interact with other components of the TPU.

| Name | Width | Direction | Description |
| --- | --- | --- | --- |
| CLK | 1 | IN | Global clock |
| RST | 1 | IN | Global Reset |
| CFG | 1 | IN | Configuration enable |
| CFG_OK | 1 | OUT | Configuration complete |
| MULT_Q | PHY_WIDTH | IN | Quotient of multiplier for config |
| MULT_R | REM_WIDTH | IN | Remainder of multiplier for config |
| CSHIFT | REM_WIDTH | IN | Precomputed cyclic shift for config |
| OFF_Q | PHY_WIDTH | IN | Quotient of starting offset |
| OFF_R | REM_WIDTH | IN | Remainder of starting offset |
| L | LEN_WIDTH | IN | Length |
| VALID | 1 | OUT | Is there data to read |
| DATA_OUT | DBUS_WIDTH | OUT | The data |

The dram_bank_read module 800 has a mod_addr submodule 820 and a rev_mod_perm module 880. All inputs to the dram_bank_read module 800 are sent to the inputs of the mod_addr module 820 with the same names. CLK, and RST are sent directly to the rev_mod_perm. In addition, a register maintaining CSHIFT and set by CFG is passed to the N input of rev_mod_perm. The CFG_OK output of mod_addr is wired directly to the CFG_OK output of the dram_bank_read module itself. Also, the OUT bus from rev_mod_perm is connected to DATA_OUT.

Additionally, the dram_bank_read module 800 includes a set of per-bank DRAM queues 840. Each queue holds up to MAX_QUEUE entries. There is no internal logic to verify queue flow control. Instead, each queue can hold the same number of entries, and the circuit utilizing the dram_bank_read 800 must ensure that no more than MAX_QUEUE read operations are in the current pipeline, perhaps via a counter. This prevents any queue from being full.

The first type of queues are the address queues (shown as AQ in FIG. 8). They hold bank specific DRAM addresses, and there is one such queue per DRAM bank. The second type of queue is the data queues (shown as DQ in FIG. 8). They hold full width DRAM bank outputs, and again, are one per bank. The final queue is the control queue (CQ) in FIG. 8. It holds control data, specifically the OFF_R and a set of per-bank enable bits for the read operation. There is exactly one control queue.

The dram_bank_read module 800 has only one register, N, which holds the N value used by rev_mod_perm.

The operation of the DRAM bank read unit 800 is detailed below:

If RST is high, all components are reset, queue are reset to empty, and N is cleared. If CFG is high, CFG is passed to mod_addr, and the N register is set to the value in CSHIFT. Otherwise, the normal operation follows. The behavior is described in terms of three separate components: enque_cntl 830 which sets up reads, deque_cntl 860 which combines banks to make a complete read, and the actual DRAM readers, represented in FIG. 8 as D.

At a high level, every timestep a read may arrive, or alternately, the lack of a read may be represented by a length of zero. Only the banks actually read from have read addresses queued. If any banks are read from (length >0), an additional control message is queued containing the offset modulus to undo the permutation in rev_mod_perm, as well as the OUT_EN bits which were set. Each DRAM reader D then pulls addresses from it's input queue AQ and writes data to it's output data queue DQ independently. Finally, the deque_cntl unit 860 examines the top of the control queue to determine which data queues must also be ready for the read results to be reconstructed. If all the required banks are ready, the deque_cntl 860 removes the appropriate queue entries and sends the now combined reads through the rev_mod_perm module 880, using the stored offset modulus to permute the output. In additional, an appropriately delayed VALID signal is sent to arrive at the output on the same clock as DATA_OUT.

The enque_cntl logic 830 operates as follows: The OUT value from mod_addr 820 is divided into banks and becomes the queue input for each address queue. The same bank's OUT_EN value is used as the ENQUEUE signal for that bank's address queue. In addition, a reduction OR operation is performed on the entire OUT_EN field, resulting in a signal ANY_EN. The full OUT_EN field along with an appropriately delayed copy of the OFF_R value are given as the input to the control queue, and ANY_EN serves as the queue's ENQUEUE signal.

The DRAM readers D operate as follows: Each DRAM reader is bank specific, and is bounded on both sides by a queue. The DRAM reader will pull from the address queue (if not empty), schedule a read, and write the results in order to the data queue, which should never be full due to the requirement of no more than MAX_QUEUE entries in flight in the entire dram_bank_read module 800. All DRAM reads will be full bank width. Beyond this, the DRAM reader implementation may use any method appropriate for the DRAM technology in use.

The deque_cntl logic 860 operates as follows: The deque_cntl module 860 will examine the EMPTY value of each data queue, as well as EMPTY value in the control queue, as well as the enable bits from the front entry of the control queue. When the control queue is not empty, and for each enable bit set in the front entry, the data queue for that bank is also not empty, VALID (with appropriate pipeline delay to match rev_mod_perm) will be set to true. In addition, in this case, the DEQUE signal will be asserted for each data queue for which an enable bit is set. Finally, the input to the rev_mod_perm module 880's IN bus will consist of the front entry for all data queues for which the associated enable bit is set, or if the bit is not set, an all zero value.

DRAM Tile Read Unit (dram_tile_read)

Figure 9:
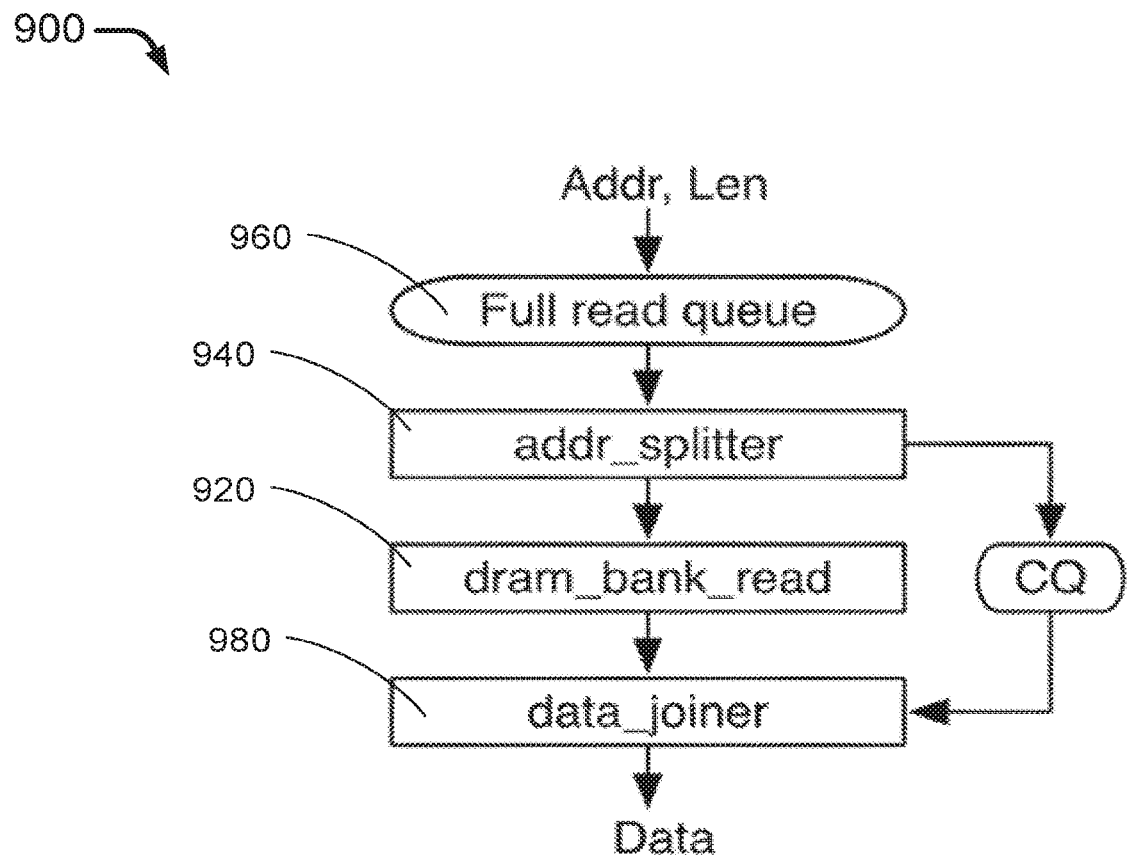
FIG. 9 is a block diagram of an example dynamic random access memory (DRAM) tile read unit according to the present disclosure.

A diagram of a DRAM tile read unit 900 is shown in FIG. 9. At a very high level, the goal of the DRAM tile read unit 900 is to read tiles of fixed width (i.e., bank size) and a variable height (i.e., up to bank size). The resulting elements are zero padded to a square array of bank size elements. Logic is shown in rectangles, and the queue is shown as an oval in FIG. 9. Internally, the tile read unit 900 uses the bank read unit 800 of FIG. 8 to perform one or more banked reads of the actual data, and then composes the results into a final output.

A set of design parameters, such as the parameters shown below along with their respective default values, determine the overall size and performance of the design of the DRAM tile read unit 900. The default values are exemplary and may be subject to change depending on design requirements.

| Name | Default Value | Description/Formula |
|---|---|---|
| DIVISOR | 11 | Number of banks, i.e., bank divisor, must be prime |
| GENERATOR | 2 | Generator for multiplicative group of DIVISOR |
| BANK_WIDTH | 32 | Width of single bank (in elements) |
| PHY_WIDTH | 28 | Physical (per bank) address bit width |
| ELEM_WIDTH | 16 | Bit width of an element |
| MAX_QUEUE | 16 | Maximum queue size |
| REM_WIDTH | 4 | ceil(log2(DIVISOR)) |
| LEN_WIDTH | 6 | ceil(log2(DIVISOR + 1)) |
| DBUS_WIDTH | 16384 | BANK_WIDTH * BANK_WIDTH * ELEM_WIDTH (Data bus width) |
| MAX_STEPS | 3 | ceil(BANK_WIDTH/DIVISOR) |
| CTR_SIZE | 2 | ceil(log2(MAX_STEPS)) |
| INNER_QUEUE | 48 | MAX_STEPS * MAX_QUEUE |

The DRAM tile read unit 900 may have the following set of external pins via which the DRAM tile read unit 900 is communicatively coupled to and interact with other components of the TPU.

| Name | Width | Direction | Description |
|---|---|---|---|
| CLK | 1 | IN | Global clock |
| RST | 1 | IN | Global Reset |
| CFG | 1 | IN | Configuration enable |
| CFG_OK | 1 | OUT | Configuration complete |
| MULT_Q | PHY_WIDTH | IN | Quotient of multiplier for config |
| MULT_R | REM_WIDTH | IN | Remainder of multiplier for config |
| CSHIFT | REM_WIDTH | IN | Precomputed cyclic shift for config |
| OFF_Q | PHY_WIDTH | IN | Quotient of starting offset |
| OFF_R | REM_WIDTH | IN | Remainder of starting offset |
| L | LEN_WIDTH | IN | Length |
| VALID | 1 | OUT | Is there data to read |
| DATA_OUT | DBUS_WIDTH | OUT | The data |

The dram_tile_read module wraps a dram_bank_read module. The non-computed parameters of the dram_bank_read module 920 follow those of the dram_tile_read module 900, except for MAX_QUEUE, which is set to INNER_QUEUE. The CLK, RST, CFG, MULT_Q, MULT_R, and CSHIFT inputs of the dram_tile_read module 900 are directly wired to the drambank_read 920, in addition to being used by the rest of the module 900. Only the OFF_Q, OFF_R and L inputs to dram_bank_read 920 are set by addr_splitter 940.

The full_read_queue 960 contains an address (Q+R portions) and a length, L. It holds MAX_QUEUE entries. The control_queue ("CQ" in FIG. 9) holds a single bit, and consists of INNER_QUEUE entries.

The operation of the DRAM tile read unit 900 is detailed below:

When L is >0, the OFF_Q, OFF_R and L values are enqueued into full_read_queue 960. Otherwise, the operation of the dram_tile_read 900 is logically divided into two subcomponents, addr_splitter 940, and data_joiner 980, which are defined below.

The address splitter addr_splitter 940 operates as follows: The addr_splitter component 940 holds 3 registers:

| Name | Width | Description |
|---|---|---|
| STEP_Q | PHY_WIDTH | Amount to add to OFF_Q per step |
| ADD_Q | PHY_WIDTH | Amount to add to OFF_Q now |
| L_OFF | LEN_WIDTH | How far into L |

When RST is high, all registers are set to 0. The L value of dram_bank_read 920 is set to zero.

When CFG is high, STEP_Q is set to MULT_Q*DIVISOR+MULT_R, and all other registers are set to 0. CFG_OK will be set to high when this operation is complete, and CFG_OK from dram_bank_read 920 is also high. The L value of dram_bank_read 920 is set to zero.

Otherwise:

```
if full_read_queue.EMPTY:
    dram_bank_read.L = 0
    full_read_queue.DEQUEUE = 0
    control_queue.ENQUEUE = 0
else:
    L_REM = full_read_queue.OUTPUT.L − L_OFF
    IS_DONE = (L_REM <= DIVISOR)
    dram_bank_read.OFF_Q = full_read_queue.OUTPUT.Q + ADD_Q
    dram_bank_read.OFF_Q = full_read_queue.OUTPUT.R + ADD_Q
    dram_bank_read.L = (IS_DONE ? L_REM : DIVISOR)
    full_read_queue.DEQUEUE = IS_DONE
    control_queue.INPUT = IS_DONE
    control_queue.ENQUEUE = 1
    ADD_Q' (IS_DONE ? 0 : ADD_Q + STEP_Q)
    L_OFF' (IS_DONE ? 0 : L_OFF + DIVISOR)
```

The data joiner component, data joiner 980, holds 2 registers, DATA_OUT, which also acts as the output value of the same name, and a counter C, which holds CTR_SIZE bits.

The operation of the data joiner 980 is as follows:

```
if dram_bank_read.VALID:
    DATA_OUT[C*DIVISOR : C*DIVISOR + DIVISOR − 1] =
    dram_bank_read.DATA_OUT
    control_queue.DEQUEUE = 1
    if control_queue.OUTPUT:
        C' = 0
        VALID = 1
    else:
        C' = C + 1
        VALID = 0
else:
    VALID = 0
    control_queue.DEQUEUE = 1
```

DRAM Bank Write Unit (dram_bank_write)

Figure 10:
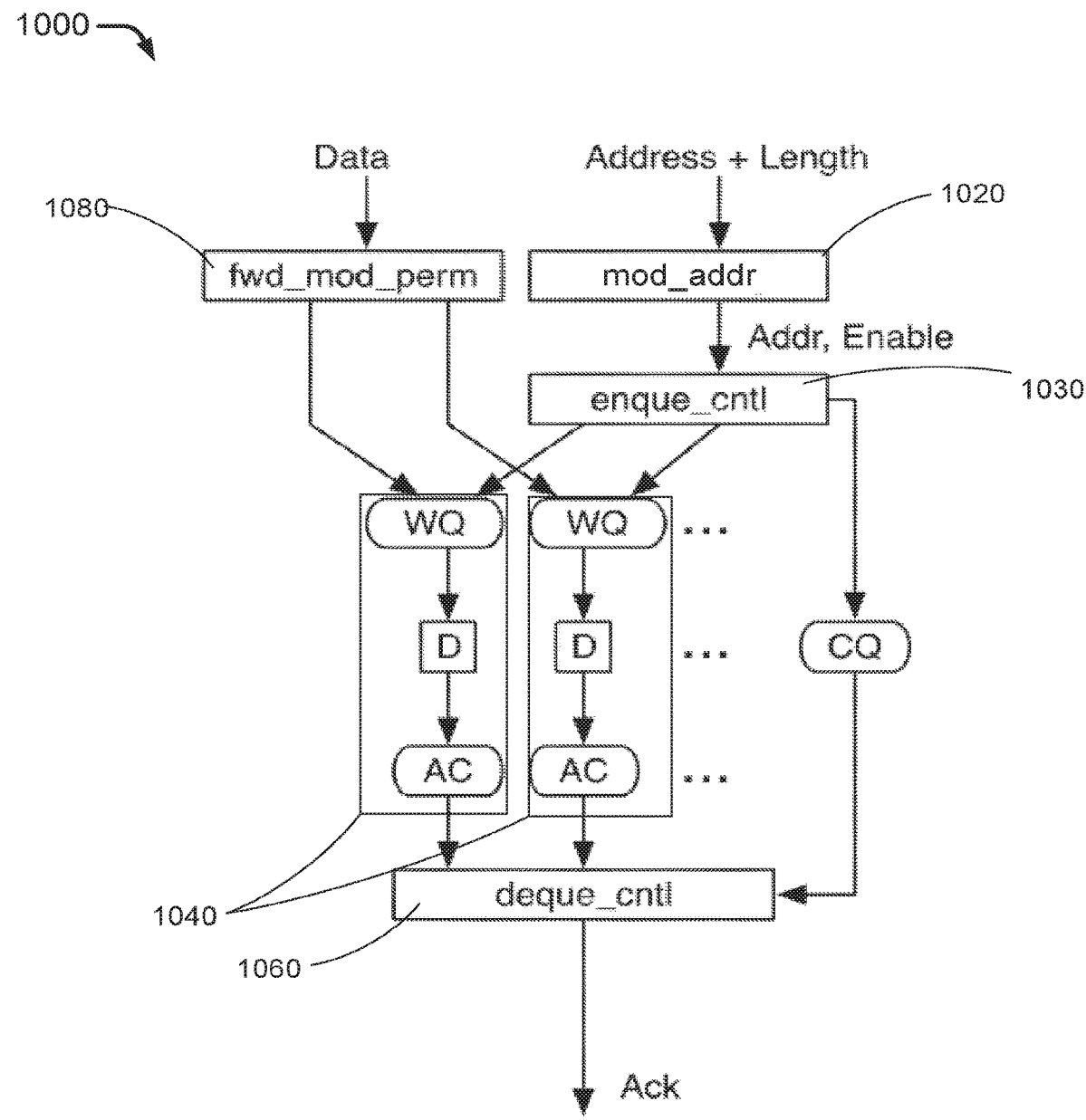
FIG. 10 is a block diagram of an example DRAM bank write unit according to the present disclosure.

An illustrative figure of the DRAM bank write unit 1000 is shown in FIG. 10. The design of DRAM bank write unit 1000, dram_bank_write, follows the design of the DRAM bank read unit 800 of FIG. 8, dram_bank_read, very closely. For example, DRAM bank write unit 1000 also includes a mod_addr submodule 1020, just as DRAM bank read unit 800 has mod_addr submodule 820. In addition, DRAM bank write unit 1000 also includes a set of per-bank DRAM queues 1040, just as DRAM bank read unit 800 has a set of per-bank DRAM queues 840. The primary difference is that in addition to the addressing information, it also receives the data to write, and the output is simply an acknowledgment of completion.

The enque_cntl logic 1030 is nearly identical to that of dram_bank_read 800, as is the dequeue_cntl logic 1060. The design parameters are exactly identical to those of the DRAM bank read unit 800 presented above. The pinouts differ slightly, being:

| Name | Width | Direction | Description |
|---|---|---|---|
| CLK | 1 | IN | Global clock |
| RST | 1 | IN | Global Reset |
| CFG | 1 | IN | Configuration enable |
| CFG_OK | 1 | OUT | Configuration complete |
| MULT_Q | PHY_WIDTH | IN | Quotient of multiplier for config |
| MULT_R | REM_WIDTH | IN | Remainder of multiplier for config |
| CSHIFT | REM_WIDTH | IN | Precomputed cyclic shift for config |
| OFF_Q | PHY_WIDTH | IN | Quotient of starting offset |
| OFF_R | REM_WIDTH | IN | Remainder of starting offset |
| L | LEN_WIDTH | IN | Length |
| DATA_IN | DBUS_WIDTH | IN | The data |
| ACK | 1 | OUT | Acknowledge one write |

The key change is DATA_OUT becomes DATA_IN, and VALID becomes ACK. Operationally, the following changes exist:

A fwd_mod_perm 1080 is applied to the data. Specifically, fwd_mod_perm.O is set via OFF_R, and fwd_mod_perm.N is set via CSHIFT. The output may require pipelining delay to assure that the address information generated by a write arrives at the queues at the same time as the data.

The queue before the DRAM operation (D) is now a write queue (WQ), containing address, enable, and data as it's entries. That is, data is added. The queue after the DRAM operation is now simply an acknowledgment (AC), which means that the queue can be replaced by a counter, such that EMPTY is defined as cnt==0, and ENQUEUE is defines as cnt=cnt+1, DEQUEUE is defined as cnt=cnt−1. The counter may be referred to as the acknowledge counter.

The actual DRAM operation now performs a write of it's input queue WQ, and when the write is acknowledged, increments the acknowledge counter AC.

The deque_cntl logic 1060 is identical to that of the DRAM bank read unit 800 of FIG. 8, except that the deque_cntl logic 1060 of FIG. 10 does not generate data, and VALID is renamed ACK.

DRAM Tile Write Unit (dram_tile_write)

The DRAM tile write unit, as shown in Figure XX, is very similar to that of the DRAM tile read unit described above, except that the pinouts are slightly changed to:

| Name | Width | Direction | Description |
|---|---|---|---|
| CLK | 1 | IN | Global clock |
| RST | 1 | IN | Global Reset |
| CFG | 1 | IN | Configuration enable |
| CFG_OK | 1 | OUT | Configuration complete |
| MULT_Q | PHY_WIDTH | IN | Quotient of multiplier for config |
| MULT_R | REM_WIDTH | IN | Remainder of multiplier for config |
| CSHIFT | REM_WIDTH | IN | Precomputed cyclic shift for config |
| OFF_Q | PHY_WIDTH | IN | Quotient of starting offset |
| OFF_R | REM_WIDTH | IN | Remainder of starting offset |
| L | LEN_WIDTH | IN | Length |
| DATA_IN | DBUS_WIDTH | IN | The data |
| ACK | 1 | OUT | Acknowledge one write |

In addition, the queue of operations (now called full_write_queue) includes the full tile data to write. The dram_bank_read is replaced by a dram_bank_write, and the data to the DATA_IN of the dram_bank_write is the DIVISOR banks of elements from the full_write_queue starting at L_OFF. It is to be noted that, since L_OFF can only be a multiple of DIVISOR, it may be useful to add an additional counter register so this slicing can be done via simple muxing. Finally, there is no output generated by data_joiner, and VALID is replaced by ACK.

SRAM Controller

SRAM is composed of a prime number of banks, each multiple elements wide, and is dual port. One port of each bank of SRAM is attached to the execution subsystem, and support simple contiguous 'linear' addressing. The other port of SRAM reads and writes tiles on behalf of the memory transfer engine, generally reading from and writing to DRAM.

RAM Tile Read Unit (sram_tile_read)

At a very high level, the goal of the SRAM tile read unit is to read tiles of fixed width (i.e., bank size) and a variable height (i.e., up to bank size). The resulting elements are zero padded to a square array of bank size elements. Components include: SRAM Bank Write Unit (sram_bank_write) andSRAM Tile Write Unit (sram_tile_write)

Memory Transfer Engine

As described earlier, the goal of memory transfer engine 380 of FIG. 3 is to move tensor slices from one memory space to another. Since each tensor is arranged in such a way that all but the final dimensions have strides which are multiples of bank width, and the final dimension is packed (i.e., stride of 1), all dimensions can be treated equally except the final one. Given that a transfer has a source and a destination, the final dimension of each means that at a minimum, two dimensional tiles must be considered during transfer.

The memory transfer engine acts as a generic mechanism which includes a tile reading circuit and a tile writing circuit. However, in general for each transfer case (i.e., from SRAM to DRAM, and from DRAM to SRAM) a separate instance of the entire transfer module exists. That is, it is generic at design time.

A set of design parameters, such as the parameters shown below along with their respective default values, determine the overall size and performance of the design of the memory transfer engine. The default values are exemplary and may be subject to change depending on design requirements.

| Name | Default Value | Description/Formula |
|---|---|---|
| IDX_COUNT | 6 | Number of indexes |
| IDX_WIDTH | 16 | Index length in bits |
| IDX_BUS | 96 | IDX_COUNT * IDX_WIDTH |
| IDX_SEL | 3 | ceil(log2(IDX_COUNT)) |
| MAX_QUEUE | 32 | Maximum queued tile reads + writes |
| RD_DIVISOR | 11 | Number of read banks, i.e., bank divisor, must be prime |
| RD_REM_WIDTH | 4 | ceil(log2(DIVISOR)) |
| RD_PHY_WIDTH | 28 | Physical (per bank) address bit width |
| RD_ADDR_WIDTH | 32 | RD_REM_WIDTH + RD_PHY_WIDTH |
| RD_POLY_WIDTH | 192 | RD_ADDR_WIDTH * IDX_COUNT |
| WR_DIVISOR | 131 | Number of write banks, i.e., bank divisor, must be prime |
| WR_REM_WIDTH | 8 | ceil(log2(DIVISOR)) |
| WR_PHY_WIDTH | 10 | Physical (per bank) address bit width |
| WR_ADDR_WIDTH | 18 | WR_REM_WIDTH + WR_PHY_WIDTH |
| WR_POLY_WIDTH | 108 | WR_ADDR_WIDTH * IDX_COUNT |
| BANK_WIDTH | 32 | Maximum length of combined read/write |
| L_WIDTH | 5 | ceil(log2(MAX_LENGTH)) |
| QUEUE_WIDTH | 6 | ceil(log2(MAX_QUEUE + 1)) |

The memory transfer engine may have the following set of external pins via which the memory transfer engine is communicatively coupled to and interact with other components of the TPU.

| Name | Width | Direction | Description |
|---|---|---|---|
| CLK | 1 | IN | Global clock |
| RST | 1 | IN | Global Reset |
| CFG | 1 | IN | Configuration enable |
| CFG_OK | 1 | OUT | Configuration complete |
| RUN | 1 | IN | Run enable |
| DONE | 1 | OUT | Run Complete |
| IDX_LENS | IDX_BUS | IN | Index sizing |
| DO_TRANS | 1 | IN | Do transpose |
| RD_BASE | RD_ADDR_WIDTH | IN | Base read address |
| RD_POLY | RD_POLY_WIDTH | IN | Read polynomial |
| RD_FMUL | RD_ADDR_WIDTH | IN | Multiplier for read index |
| RD_FIDX | IDX_SEL | IN | Index number for read index |
| RD_FLEN | BANK_WIDTH | IN | Final length for read index |
| RD_CSHIFT | RD_REM_WIDTH | IN | CSHIFT for RD_FMUL |
| WR_BASE | RD_ADDR_WIDTH | IN | Base read address |
| WR_POLY | WR_POLY_WIDTH | IN | Read polynomial |
| WR_FMUL | WR_ADDR_WIDTH | IN | Multiplier for read index |
| WR_FIDX | IDX_SEL | IN | Index number for read index |
| WR_FLEN | BANK_WIDTH | IN | Final length for read index |
| WR_CSHIFT | WR_REM_WIDTH | IN | CSHIFT for WR_FMUL |

The memory transfer engine includes the following sub-modules, as shown in the table below:

| Module Type | Module Name |
|---|---|
| mdim_count | rd_cntr |
| mdim_count | wr_cntr |
| mdim_addr | rd_addr |
| mdim_addr | wr_addr |
| tile_reader | rd_tile |
| tile_writer | wr_tile |

In the table above, each of rd_cntr and wr_cntr is a multidimensional counter unit that is described previously. Also, each of rd_addr and wr_addr is a multidimensional address unit that is described previously. In addition, tile_reader is a tile reading module (such as dram_tile_read module described previously), while tile_writer is a tile writing module (such as dram_tile_write module described previously). Most of the pins to each submodule consist of fixed connections either to the main modules or between submodules, as per the following table:

| Source Module | Pins | Destination Module | Pins |
|---|---|---|---|
| mem_tx | CLK | * | CLK |
| mem_tx | RST | * | RST |
| mem_tx | CFG | * | CFG |
| mem_tx | IDX_LENS | rd_cntr | CFG_IN |
| mem_tx | RD_BASE.Q | rd_addr | QUOT_IN |
| mem_tx | RD_BASE.R | rd_addr | REM_IN |
| mem_tx | RD_POLY | rd_addr | DELTA_IN |
| mem_tx | RD_FMUL.Q | rd_tile | MULT_Q |
| mem_tx | RD_FMUL.R | rd_tile | MULT_R |
| mem_tx | RD_CSHIFT | rd_tile | CSHIFT |
| rd_cntr | NEXT | rd_addr | IDX |
| mem_tx | IDX_LENS | wr_cntr | CFG_IN |
| wr_addr | QUOT | wr_tile | OFF_Q |
| wr_addr | REM | wr_tile | OFF_R |
| mem_tx | WR_BASE.Q | wr_addr | QUOT_IN |
| mem_tx | WR_BASE.R | wr_addr | REM_IN |
| mem_tx | WR_POLY | wr_addr | DELTA_IN |
| mem_tx | WR_FMUL.Q | wr_tile | MULT_Q |
| mem_tx | WR_FMUL.R | wr_tile | MULT_R |
| mem_tx | WR_CSHIFT | wr_tile | CSHIFT |
| rd_cntr | NEXT | wr_addr | IDX |
| wr_addr | QUOT | wr_tile | OFF_Q |
| wr_addr | REM | wr_tile | OFF_R |

In the table above, * refers to all modules which have a pin by tge proper name. Also, .Q and .R refer to the quotient and remainder part of combined buses. In addition, mem_tx.CFG_OK is just the AND of rd_tile.CFG_OK and wr_tile.CFG_OK.

The memory transfer engine includes the following registers:

| Name | Width | Description |
| --- | --- | --- |
| PEND | QUEUE_WIDTH | How many reads are pending |
| RD_FIDX | IDX_SEL | Stored value of RD_FIDX |
| RD_FLEN | IDX_SEL | Stored value of RD_FLEN |
| WR_FIDX | IDX_SEL | Stored value of WR_FIDX |
| WR_FLEN | IDX_SEL | Stored value of WR_FLEN |
| DO_TRANS | 1 | Stored value of DO_TRANS |

The operation of the memory transfer engine is as follows:

If RST is held high, all modules are reset, and the registers are zeroed.

If CFG is held high, PEND is zeroed, and RD_FIDX, RD_FLEN, WR_FIDX, and WR_FLEN registers are set to the current input values. When all submodules report CFG_OK, the transfer module reports CFG_OK.

Always, the value of rd_tile.DATA_OUT is passed to wr_tile.DATA_IN, either transposed or not, based on the value of the DO_TRANS register. In the case where the tile elements are transposed, the value of rd_tile.DATA_OUT is considered as a BANK_WIDTH by BANK_WIDTH tile, and the tile elements are transposed when passed to wr_tile.DATA_IN.

The value of wr_tile.L, wr_cntr.STEP, and wr_addr.STEP are set as follows:

```
if (RST or CFG or !wr\_tile.VALID):
    wr\_cntr.STEP = 0
    wr\_addr.STEP = 0
    wr\_tile.L = 0
else:
    wr\_cntr.STEP = 1
    wr\_addr.STEP = 1
    if (wr\_cntr != WR\_FIDX):
        wr\_tile.L = BANK\_WIDTH
    else:
        wr\_tile.L = WR\_FLEN + 1
```

The value of rd_tile.L, rd_cntr.STEP and rd_addr.STEP are set as follows:

```
if (RST or CFG or rd\_cntr.OVER):
    rd\_cntr.STEP = 0
    rd\_addr.STEP = 0
    rd\_tile.L = 0
else:
    rd\_cntr.STEP = 1
    rd\_addr.STEP = 1
    if (wr\_cntr != RD\_FIDX):
        rd\_tile.L = BANK\_WIDTH
    else:
        rd\_tile.L = RD\_FLEN + 1
```

PEND is increased by one if a read is started, and decreased by one if a write is complete (i.e., wr_tile.ACK is true). Both of these may happen in the same cycle. Finally, DONE is set when rd_cntr.DONE is true, wr_cntr.DONE is true, and PEND is 0.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A processing unit comprising:
   at least one execution unit comprising:
      a clock input to receive a clock;
      an operation specification input to receive an opcode that specifies an instruction;
      a first operand input to receive a first operand;
      a second operand input to receive a second operand; and
      an accumulation register to store a current accumulation value, wherein the accumulation register is to be updated, within a clock cycle, with a new accumulation value based on the opcode and one or more of the first operand, the second operand, and the current accumulation value, wherein an output of the accumulation register comprises saturated lower bits of the new accumulation value.

2. The processing unit of claim 1, wherein the at least one execution unit further comprises:
   a random number register to store a current random number, wherein the instruction comprises a seed random number generator operation, and wherein the random number register is to be updated, within the clock cycle, with a new random number based on the first operand, the second operand, and the current random number.

3. The processing unit of claim 1, wherein the at least one execution unit further comprises:
   a conditional execution input to receive a conditional execution input, wherein the instruction is to be executed or skipped as determined by the conditional execution input.

4. The processing unit of claim 3, wherein the at least one execution unit further comprises:
   a conditional set mask to receive a conditional set mask;
   a conditional reset mask to receive a conditional reset mask; and
   a status register, wherein, when the instruction is executed as determined based on the conditional execution input, bits of the status register are to be updated, within the clock cycle, based on corresponding bits of the conditional set mask and corresponding bits of the conditional reset mask.

5. The processing unit of claim 4, wherein the instruction comprises a compare operation, and wherein bits of the status register are to be updated only when the compare operation returns a true result.

6. The processing unit of claim 1, further comprising an indexing module to loop over a plurality of indexes each corresponding to one of multiple dimensions of a tensor, the indexing module comprising:
   a counter unit comprising:
      a plurality of counter registers each to store a respective one of the plurality of indexes; and
      a plurality of size registers each corresponding to one of the plurality of counter registers; and
   an address unit, wherein:
      the counter unit is to update the plurality of indexes stored in the plurality of counter registers, and the address unit is to generate, for each of the plurality of indexes stored in the plurality of counter registers, an address that is a polynomial of the respective index.

7. The processing unit of claim 6, wherein the address unit further is to generate a quotient and a remainder of the address by division of the address with a fixed modulus.

8. The processing unit of claim 7, wherein the address unit is to receive, for each of the plurality of indexes stored in the plurality of counter registers, a delta comprising a quotient delta and a remainder delta with respect to the fixed modulus, and wherein the address unit is to update the address by adding the quotient delta to the quotient of the address and the remainder delta to the remainder of the address.

9. The processing unit of claim 6, wherein:
the indexing module is to be driven by a clock, the counter unit further comprising an OVER register and a NEXT register, wherein the at least one execution unit is to:
reset the plurality of counter registers and the plurality of size registers to 0;
set the OVER register to 1 and the NEXT register to 0;
configure the plurality of counter registers with a configuration input;
configure the plurality of size registers with the configuration input;
set the OVER register to 0 if any counter register contains a non-zero value;
update the NEXT register based on a counter register of a highest sequence of the plurality of counter registers that contains a non-zero value;
decrement the non-zero value of the counter register by 1 and update a plurality of counter registers having a higher sequence than specified by the NEXT register with the corresponding plurality of size registers; and
repeat the plurality of update of the NEXT register, the decrement of the non-zero value and the update of the counter registers until each of the plurality of counter registers contains 0.

10. The processing unit of claim 1, wherein the processing unit comprises a tensor processing unit.

11. The processing unit of claim 10, wherein the processing unit further comprises a multicast network to couple a plurality of execution units to a memory.

12. A system comprising:
a central processing unit (CPU);
a memory coupled to the CPU via a bus; and
a tensor processing unit (TPU) coupled to the CPU via the bus, the TPU comprising:
a plurality of execution units, each of the plurality of execution units comprising:
a clock input to receive a clock;
an operation specification input to receive an opcode that specifies an instruction;
a first operand input to receive a first operand;
a second operand input to receive a second operand; and
an accumulation register to store a current accumulation value, wherein the accumulation register is to be updated, within a clock cycle with a new accumulation value based on the opcode and one or more of the first operand, the second operand, and the current accumulation value, wherein an output of the accumulation register comprises saturated lower bits of the new accumulation value.

13. The system of claim 12, wherein each of the plurality of execution units further comprises:
a random number register to store a current random number, wherein the instruction comprises a seed random number generator operation, and wherein the random number register is to be updated, within the clock cycle, with a new random number based on the first operand, the second operand, and the current random number.

14. The system of claim 12, wherein each of the plurality of execution units further comprises:
a conditional execution input to receive a conditional execution input, wherein the instruction is to be executed or skipped as determined by the conditional execution input.

15. The system of claim 14, wherein each of the plurality of execution units further comprises:
a conditional set mask to receive a conditional set mask;
a conditional reset mask to receive a conditional reset mask; and
a status register, wherein, when the instruction is executed as determined based on the conditional execution input, bits of the status register are to be updated, within the clock cycle, based on corresponding bits of the conditional set mask and corresponding bits of the conditional reset mask.

16. The system of claim 15, wherein the instruction comprises a compare operation, and wherein bits of the status register are to be updated only when the compare operation returns a true result.

17. The system of claim 12, further comprising an indexing module to loop over a plurality of indexes each corresponding to one of multiple dimensions of a tensor, the indexing module comprising:
a counter unit comprising:
a plurality of counter registers each to store a respective one of the plurality of indexes; and
a plurality of size registers each corresponding to one of the plurality of counter registers; and
an address unit, wherein:
the counter unit is to update the plurality of indexes stored in the plurality of counter registers, and the address unit is to generate, for each of the plurality of indexes stored in the plurality of counter registers, an address that is a polynomial of the respective index.

18. The system of claim 17, wherein the address unit further is to generate a quotient and a remainder of the address by division of the address with a fixed modulus.

19. The system of claim 18, wherein the address unit is to receive, for each of the plurality of indexes stored in the plurality of counter registers, a delta comprising a quotient delta and a remainder delta with respect to the fixed modulus, and wherein the address unit is to update the address by adding the quotient delta to the quotient of the address and the remainder delta to the remainder of the address.

20. The system of claim 12, further comprising an intermediate language generator coupled to the system to receive encoded training sets from a cross-compiler and formulate therefrom training data to be provided to the system.

* * * * *